United States Patent

Stone et al.

[11] Patent Number: 5,932,029
[45] Date of Patent: Aug. 3, 1999

[54] SOLAR THERMOPHOTOVOLTAIC POWER CONVERSION METHOD AND APPARATUS

[75] Inventors: Kenneth W. Stone, Huntington Beach; Stanley Schneider, Rancho Palos Verdes; Raymond J. Schmitt, Fountain Valley, all of Calif.

[73] Assignee: McDonnell Douglas Corporation, St. Louis, Mo.

[21] Appl. No.: 08/804,075

[22] Filed: Feb. 21, 1997

[51] Int. Cl.[6] .................................................. H01L 31/00
[52] U.S. Cl. ................................................................ 136/253
[58] Field of Search ............................................. 136/253

[56] References Cited

U.S. PATENT DOCUMENTS 4,316,048  2/1982  Woodall .................................. 136/253
5,356,487  10/1994  Goldstein et al. ..................... 136/253

*Primary Examiner*—Mark Chapman
*Attorney, Agent, or Firm*—Westerlund & Powell, P.C.; Robert A. Westerlund; Ramon R. Hoch

[57] ABSTRACT

Solar power is concentrated onto an absorptive surface of a body to heat the body to thus result in infrared emissions. The wavelength spectrum of the infrared emissions is tailored to match the optimal incident wavelength spectrum of photovoltaic cells. This tailoring is accomplished by use of an infrared filter and/or a coating material on an emissions surface of the body. The photovoltaic cells, constructed to match the radiation spectrum of the infrared emissions, convert the infrared emissions to electric energy.

29 Claims, 26 Drawing Sheets

THERMAL CONDUCTORS

REAR TPV EMITTER SURFACE

REAR TPV EMITTER SURFACE

Sun ray

Surface texturing with micron holes

High absorption

Sun Spectrum

Low emittance

Wavelength

Circumference of cylinder = L = $2\pi R$

Emitter circumference = E = $\pi r$

Let emitter radius = r = $aL/(2n)$
  Where
    a = ratio of area between emitters
    n = number of emitter segments ER = emitter area/circumference area
ER = $n2\pi/L = n2\pi aL/(2nL) = a\pi$

| Material | Density | Specific Heat | Heat of Fusion | Melting Point | Boiling Point | Vapor Pressure |
|---|---|---|---|---|---|---|
| | gm/cc | cal/gm/k | cal/gm | deg/gm | deg K | 1E-7 atm 1E-3 atm |
| FeAl (50/50) | 5.27 | 0.26 | 78.5 | 1440 | 2740 | 1900 |
| Silicon (bulk) | 2.33 | 0.266 | 365 | 1683 | 2620 | 1750 2340 |
| Beryllium | 1.85 | 0.84 | 324 | 1551 | 3243 | |
| BeGeSi (30,30,40) | 3.09 | 0.392 | 290 | 1503 | 2919 | |

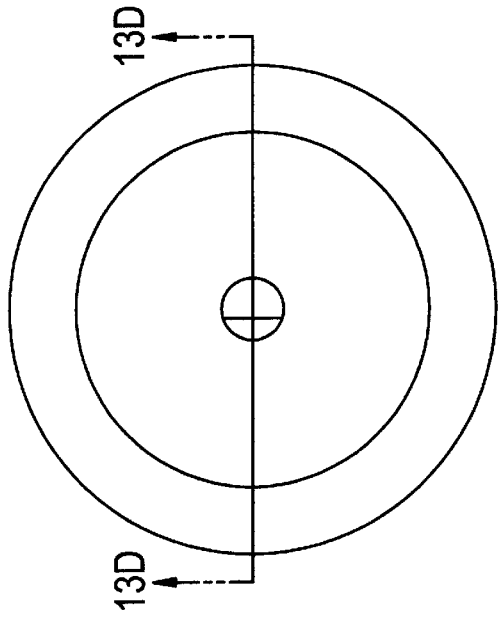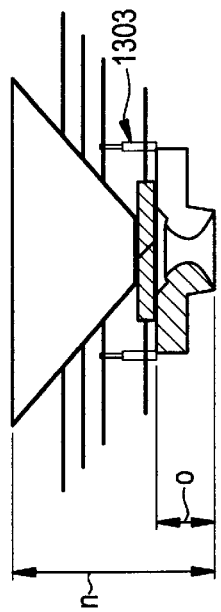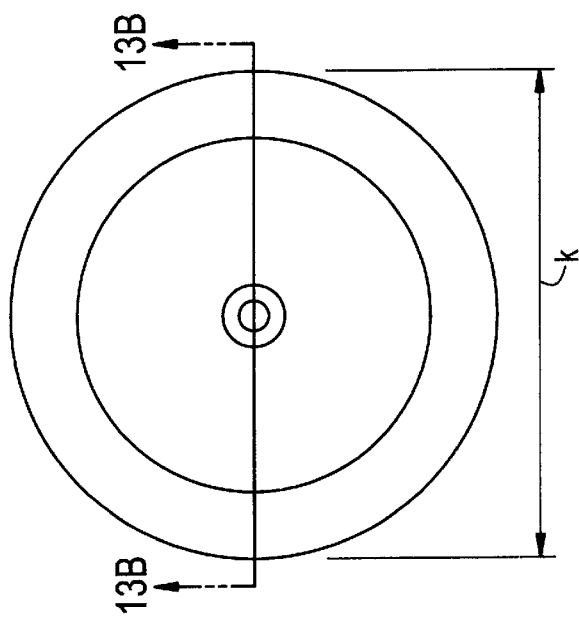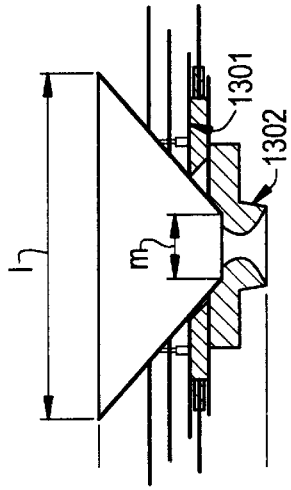

af ag

COOLING CONTROL VALVE

COOLING CONTROL VALVE

PV CELLS MOUNTING PLATE AND COOLING ASSEMBLY

SOLAR THERMOPHOTOVOLTAIC POWER CONVERSION METHOD AND APPARATUS

BACKGROUND OF THE INVENTION

1. Field of the Invention

The present invention relates to a method and apparatus for converting solar energy to electric energy, and in particular, to a method and apparatus which focus solar energy onto an absorbing receiver body to cause the body to emit infrared energy, and which tailor the spectrum of the infrared energy for application to photovoltaic (PV) cells for high-efficiency conversion to electric energy as generally illustrated at the top of FIG. 3 of the drawings. The invention is usefull in both terrestrial and space applications, and provides for storing energy for conversion to electrical power when needed. It also provides for use of an alternative heat source when solar energy is not available.

2. Description of the Related Art

FIG. 1 illustrates the measured peak power efficiency of the kinematic Stirling dish, which has previously set the standard for the highest solar power conversion efficiency. As shown, a unit available irradiance A is designated 1.0; the component dish concentrator reflectivity efficiency B is 0.92; the component intercept efficiency C is 0.97; the component receiver efficiency D is 0.90; the component power conversion efficiency E is 0.39; and the component parasitic efficiency F is 0.96. This results in a cumulative efficiency of 30.4%. That is, about 30% of the incident power is applied, for example, to a space vehicle or utility grid line. This is much higher than other conventional concentrating or non-concentrating photovoltaic (PV) systems, the Bryton system, the Rankin system or the Stirling free-piston system (typically less than 22% efficiency). The Stirling engine does, however, suffer drawbacks. For example, the efficiency of the Stirling engine, having heat transferring gas flowing therethrough, is sensitive to solar flux level distribution. Further, in the tube impingement receiver of the Stirling engine, each facet must be aimed at different points on the receiver in order to obtain high efficiency and long receiver life. This increases manufacturing costs. In addition, the overall mass of the Stirling engine is relatively high.

In fact, numerous techniques are known for conversion of solar energy to electric energy, all of which suffer drawbacks ranging from low conversion efficiencies to high manufacturing and/or maintenance costs. For example, solar power dynamic systems have moving parts which tend to reduce reliability and increase maintenance costs. Also, conventional photovoltaic systems (solar cells) and most dynamic systems lack the capability to produce electricity during periods of cloud cover or after the sun has set. Moreover, the direct impingement receiver, the heat pipe receiver, and the pool boil receiver require relatively expensive and toxic materials and costly manufacturing processes.

SUMMARY OF THE INVENTION

The present invention is therefore directed to a solar power conversion method and a solar power conversion apparatus which substantially overcomes many of the problems due to the limitations and disadvantages of the related art.

In general, the solar power conversion of the present invention concentrates solar energy onto an absorptive body to heat the body to thus result in infrared emissions. The infrared emissions are converted by any suitable technique (s) to a desired wavelength band, the wavelength band being that at which photovoltaic cells have a high conversion efficiency. The photovoltaic cells, which are constructed of material whose electrical response matches the radiation spectrum of the converted infrared emissions, then utilizes the infrared emissions to produce electric energy with greater efficiency.

The estimated power conversion efficiency of the present invention, as shown in FIG. 2, is comparable to or higher than that of the kinematic Stirling engine (FIG. 1). That is, according to the present invention, an estimated 27 to 51% of incident power is applied to the space vehicle or utility grid line. Moreover, the energy conversion components of the invention are devoid of moving parts, thus resulting in higher reliability and lower maintenance costs.

The absorbed solar energy can be used either directly to produce electricity or stored as thermal energy in a heat reservoir and used at a later time (when the solar energy is low or not available) to produce electricity. For space applications, the stored energy can be converted to electricity during the eclipse part of the orbit. For terrestrial applications, the stored energy can be converted to electricity during periods of cloud cover or after the sun has set. Also, the solar receiver has a relatively low sensitivity to solar flux level distribution.

The nature of the material used in the receiver allows for a specially designed curved shape to be easily made at a low cost. Also, there are no high tolerance requirements in the manufacturing of the conversion unit such as bearings, rings or mating surfaces, thus resulting in a cost savings. Further costs are saved in the manufacturing of the dish concentrator assembly since the receiver is designed so that all concentrator facets can be aimed at a single aimpoint.

The thermal storage, which is one aspect of the invention, allows for variation of the output power independent of the input power level. This greatly decreases the complexity of the power distribution system for both space and terrestrial remote site applications. Moreover, the receiver design can be heated with solar energy when available or burn a gas when solar energy is not available. Heat from other sources can also be used, e.g., radioactive isotope heat emission, heat from a nuclear reactor, etc. The system can thus produce power upon demand, not possible with conventional PV systems.

In another aspect of the invention, the design of an emitting area concentrates IR radiation to a very high level on PV cells to result in highly efficient conversion to electrical energy. This allows the required area of the PV cells to be reduced, which in turn reduces the system cost, noting that the PV cells are the most expensive component. Also, the operation of the PV cells is less sensitive to cell temperature. As the cell temperature increases, the cell quantum efficiency increases at the longer IR wavelengths where there is more energy than a conventional PV system which operates at shorter wavelength light. The short circuit current will increase more than for a conventional concentrating PV system, which in turn would decrease the radiator size required for a space application.

According to a further aspect of the invention, the PV cells are mounted together in groups. This allows for less wiring than normal flat plate PV panels. Less wiring means lower material and manufacturing costs, as well as lower ohmic wiring losses resulting in higher system efficiency and lower mass. The incident power on the PV cells is isolated from the movement of the concentrator, and the flux on the cells does not vary as it does on normal PV concentrating systems. This results in increasing the power efficiency over concentrating PV systems. Also, since the incident power does not vary and the cells are in groups, the cells within each group can be connected in series and parallel groups in such a way as to maximize the output power. This cannot be done in normal PV systems.

The PV cells have very high quantum efficiency in the region of operation, and there is very little energy that enters the cells which is not converted to electrical current. Less unconverted energy thus goes into heating up the cell, reducing the burden on the cooling system. This in turn means less radiator area and cost, and higher output power due to reduced parasitic power needed to operate the cooling system.

Since there are no high speed components that exert high forces, light weight and low strength materials can be used, and thus the mass of the solar thermophotovoltaic power (STPV) convertor of the present invention is substantially lower than other dynamic systems (solar or otherwise). The table below compares the mass of the STPV convertor of the invention with that of the Stirling engine.

| Component | STPV | Sterling |
|---|---|---|
| Aperture Cone | 22.7kg | 22.7kg |
| Receiver | 22.7 | 22.7 |
| Power Conversion | 45.4 | 453.6 |
| Insulation | 34.0 | 13.6 |
| Cooling System | 68.0 | 68.0 |
| Support Structure | 45.4 | 90.7 |
| Control System | 9.1 | 9.1 |
| TOTAL | 247.3kg | 680.4kg |

According to yet another aspect of the invention, shutters are provided to prevent loss of radiating energy from the thermal reservoir. This is in contrast to systems that must extract electricity when not needed for storage. The heat reservoir of the invention stores the energy in thermal form, rather than in costly batteries, fuel cells, etc., thus providing a substantial weight and volume advantage, particularly for space applications.

In a further aspect of the invention, infra-red emitters can be designed with below cutoff groves to minimize very long wavelength emission which can not produce electricity since their photon energy is below the bandgap of the PV cells. This leads to substantially higher emission efficiency and a decrease in heating of the PV cells, again reducing thermal cooling requirements. Also, a narrow band IR filter can be deployed in front of the PV cells to further increase the collection efficiency and lower the cell cooling requirements. The IR emitter spectrum is chosen to emit in a band matched to the optimum wavelength of the PV cell response.

To achieve these and other advantages, and in accordance with the purpose of the invention as embodied and broadly described, the invention provides for a method for converting solar energy to electric energy, comprising: focusing solar energy onto an absorptive receiver surface of a body to cause an emitting surface of the body to emit thermal energy; tailoring the emission spectrum of the thermal energy emitted by the body to match an optimal wavelength response spectrum of a photovoltaic cell; and directing the spectrally optimized emission spectrum onto the photovoltaic cell for conversion from thermal energy to electric energy.

The invention further provides for an solar conversion apparatus, comprising: a housing having a solar inlet which directs solar energy into the housing; an absortive body contained within the housing, wherein the solar energy is incident on a receiver surface part of the body to cause an emitting surface part of the body to emit thermal energy; a photovoltaic cell assembly having an optimal wavelength spectrum at which an infrared to electric conversion is of a maximum efficiency; and means interposed between the photovoltaic cell assembly and the emitting surface part of the body for tailoring the emission spectrum of the thermal energy to match the optimal wavelength spectrum of said photovoltaic cell assembly.

BRIEF DESCRIPTION OF THE DRAWINGS

The foregoing and other objects, aspects and advantages will be better understood from the following detailed description of a preferred embodiment of the invention with reference to the drawings, in which:

FIGS. 13(a) through 13(g) illustrate various views of the aperture reflector subsystem of the present invention;

DETAILED DESCRIPTION OF THE PREFERRED EMBODIMENTS

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility.

Figure 2:
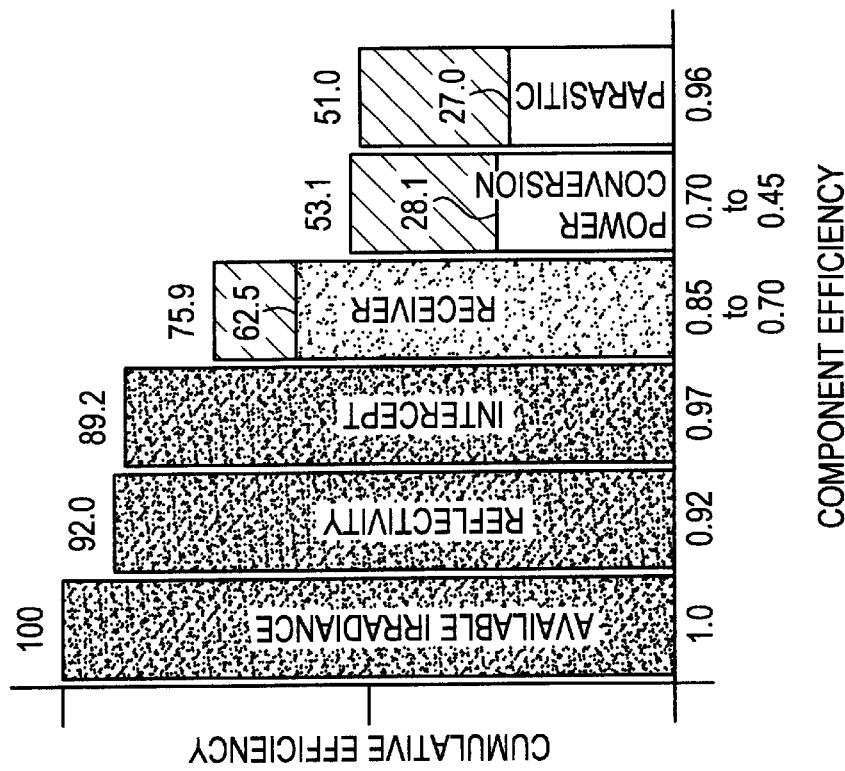
FIG. 2 is a bar graph showing the estimated peak power efficiency of the solar thermophotovoltaic (STPV) power conversion unit of the present invention.
Figure 1:
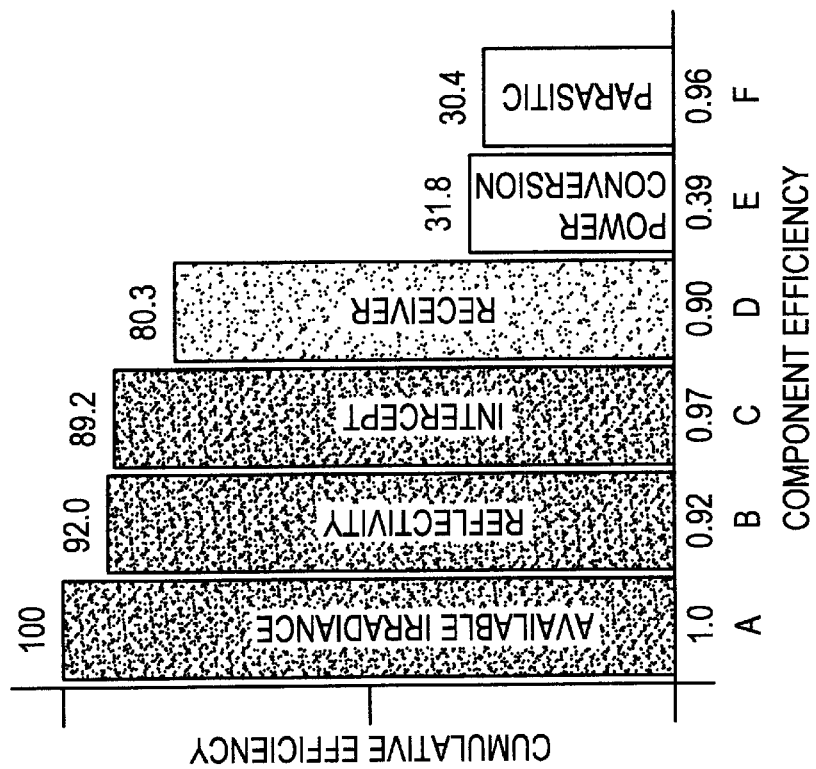
FIG. 1 is a bar graph showing the measured peak power efficiency of the kinematic Stirling Dish.
Figure 3A:
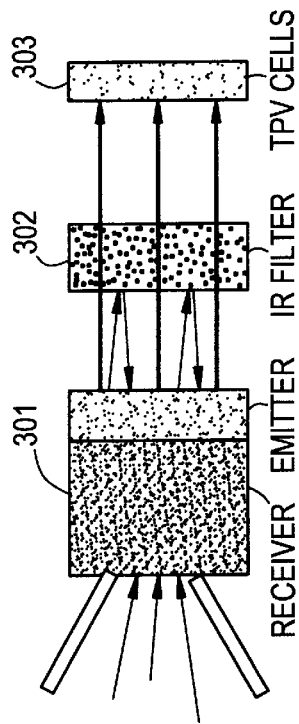
FIGS. 3A through 3E illustrates the major components and the basic operating principle, with spectral plots, of the STPV system of the present invention.
Figure 3B:
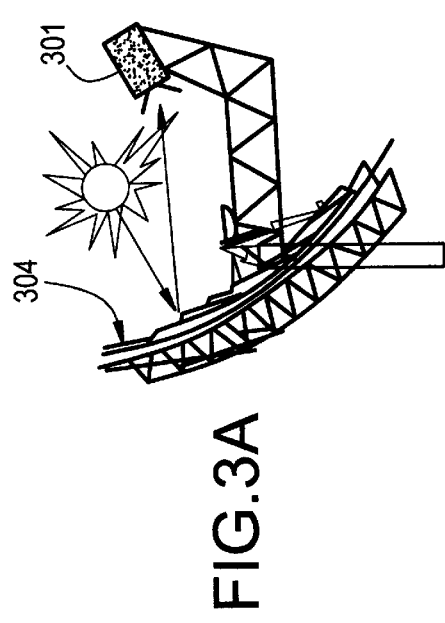
Figure 3C:
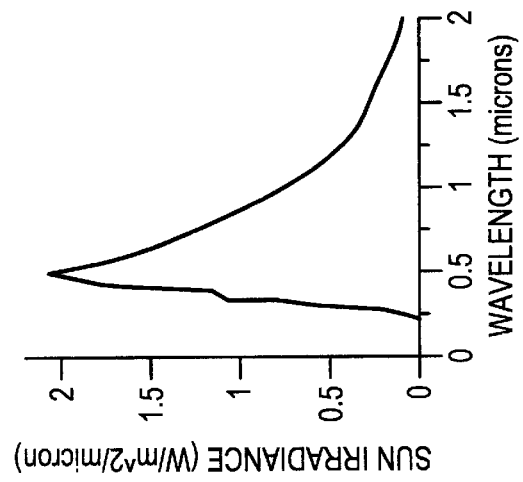
Figure 3D:
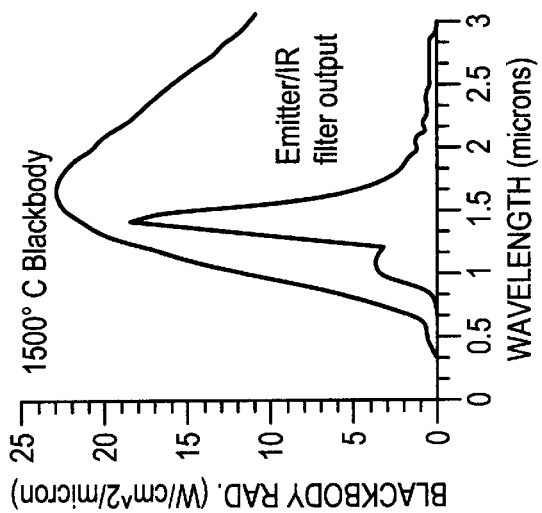
Figure 3E:
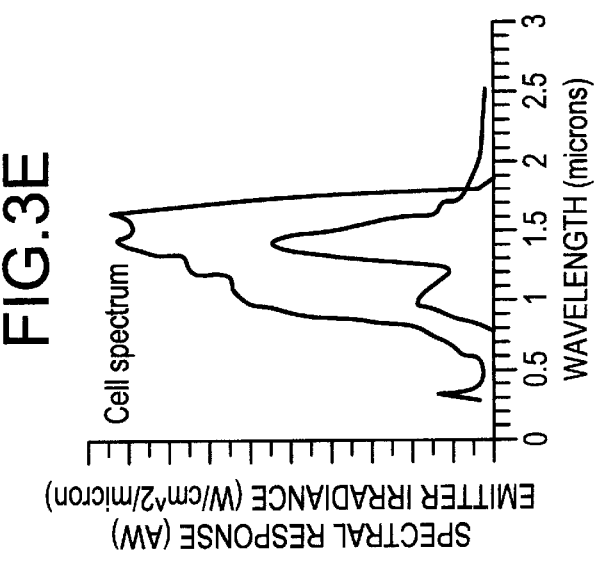

The basic operating principle of the solar thermophotovoltaic (STPV) converter of the present invention is illustrated in FIGS. 3A and 3B. As shown, the sun's irradiance is focused or concentrated onto an absorptive receiver surface of a body 301, resultant infrared (IR) emissions are tailored by an emitter surface/IR filter 302, and the tailored IR emissions are applied to photovoltaic cells (PV) 303. The energy conversion scheme is to convert the sun's radiative power, which is largely at visible wavelengths where the PV cells 303 have low efficiency, to wavelengths where the PV cells 303 have high conversion efficiency. The incident solar radiation is focused on the blackbody receiver 301(for example, by a dish concentrator 304), and the temperature of the receiver material rises and radiates as a blackbody. This radiation spectrum is tailored by the emitter/IR filter 302 (for example, by an IR filter and/or by covering the blackbody surface with a material such as a rare earth oxide that emits substantial power at a desired wavelength band) such that the resulting radiation is confined to a desired narrow bandwidth. The PV cell 303 is constructed to match this radiation spectrum so as to convert a large percentage of the incident IR radiation to electric power. That is, the plot of FIG. 3C shows the radiation spectrum of the sun's irradiance, whereas the plots of FIG. 3D show the output radiation spectrum of the receiver storage body receiver 301 and the emitter/IR filter 302, respectively. Finally, the plots of FIG. 3E illustrates the matched PV cell spectrum and the emitter/IR filter 302 output spectrum, respectively.

While this disclosure specifically describes the "solar" version of the TPV power conversion system, there are numerous other possible means to provide the necessary energy for operation of the TPV device. Among them are nuclear heat sources, natural gas heaters, liquid fuel heaters (gasoline, kerosene and crude oil), geothermal heat sources, and methane from biomass sources.

Figure 4A:
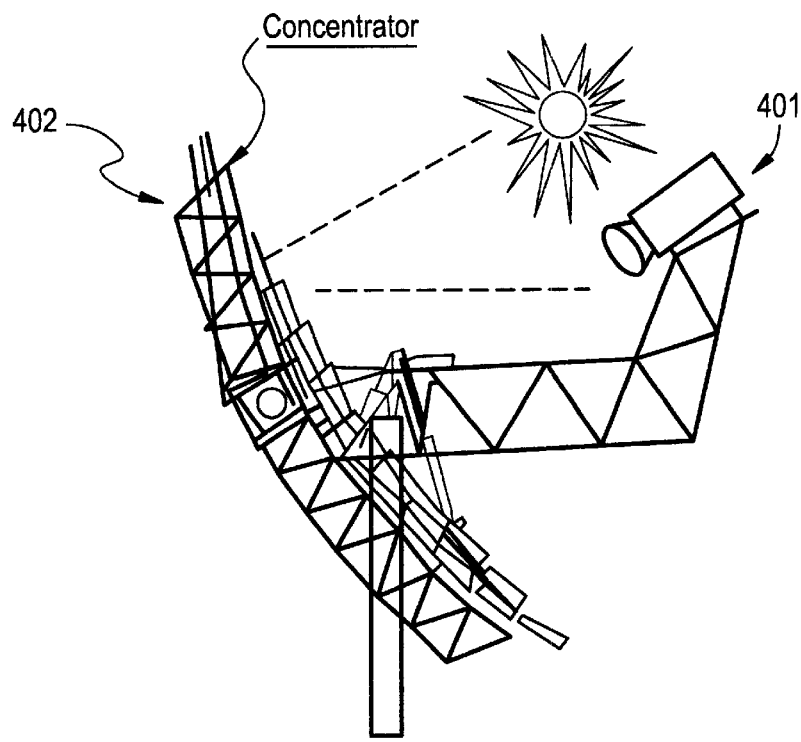
FIGS. 4(a) and 4(b) show the major component parts of the STPV system (illustrated for terrestrial applications)
Figure 4B:
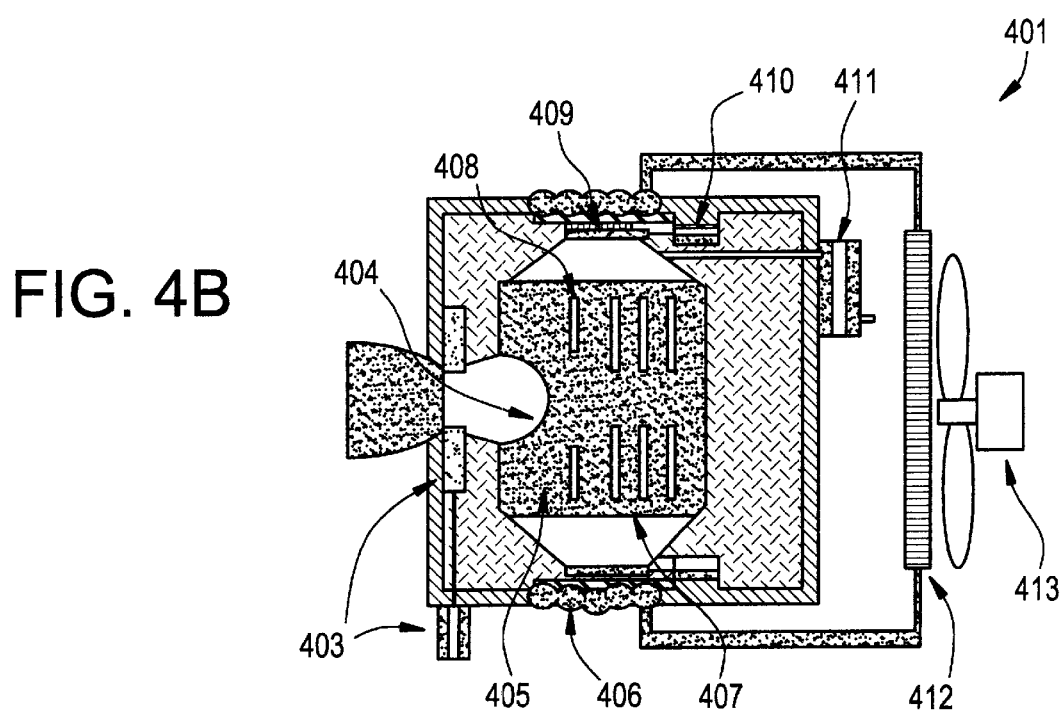

FIGS. 4(a) and 4(b) generally illustrate, by way of example, the basic components of the STPV converter of the present invention. As shown, a power conversion unit 401 receives focused sun irradiations concentrated by a dish concentrator 402. The power conversion unit 401 includes aperture shutters 403, a receiver absorber 404, a thermal storage 405, cooling coils 406, an emitter 407, thermal fins 408, PV cells 409, emitter shutters 410, a vacuum pump 411, a radiator 412 and a cooling fan 413.

Figure 5A:
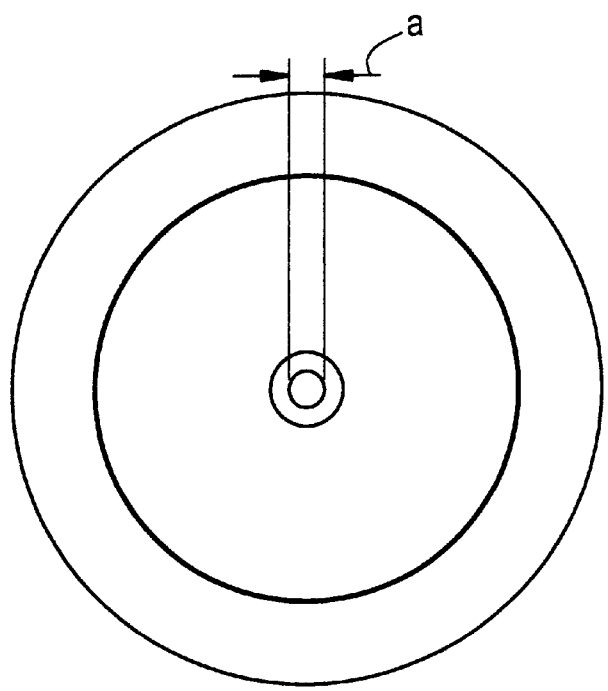
FIGS. 5(a) through 5(f) show detailed views of an exemplary power conversion unit of the present invention.
Figure 5B:
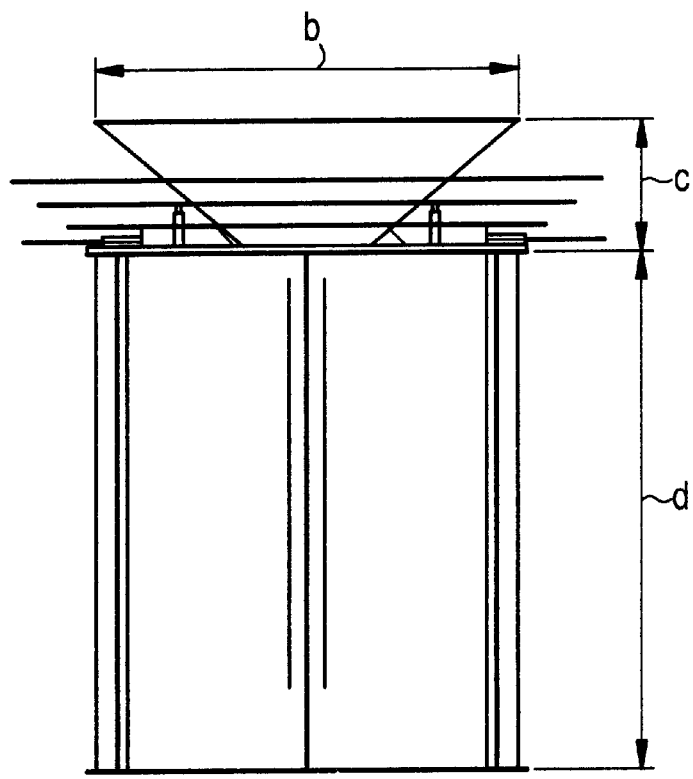
Figure 5C:
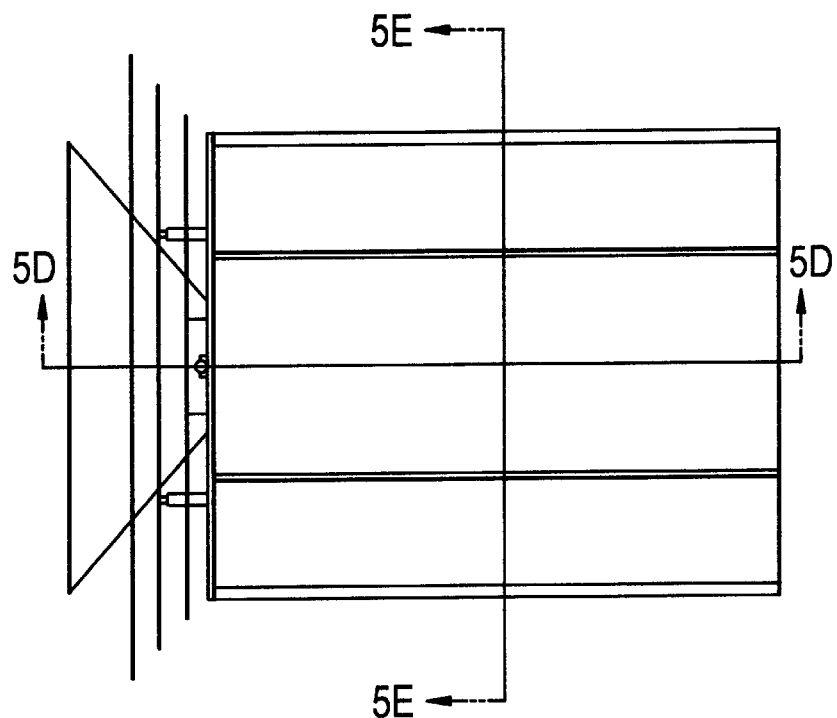
Figure 5D:
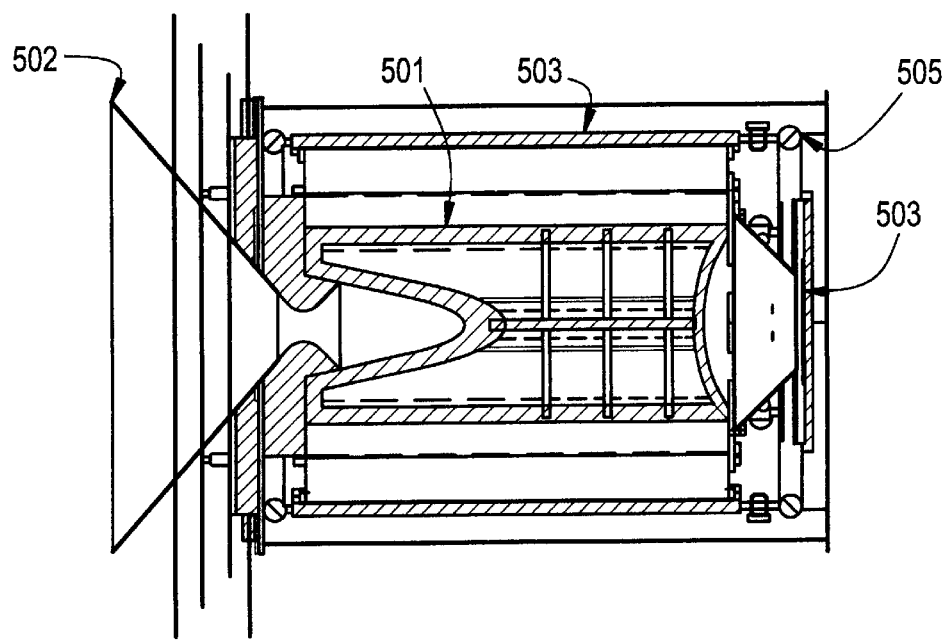
Figure 5F:
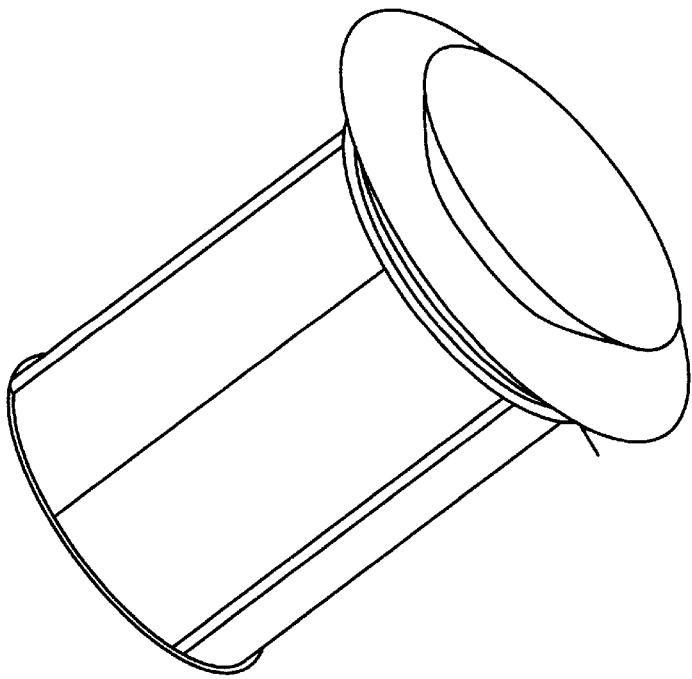
Figure 5E:
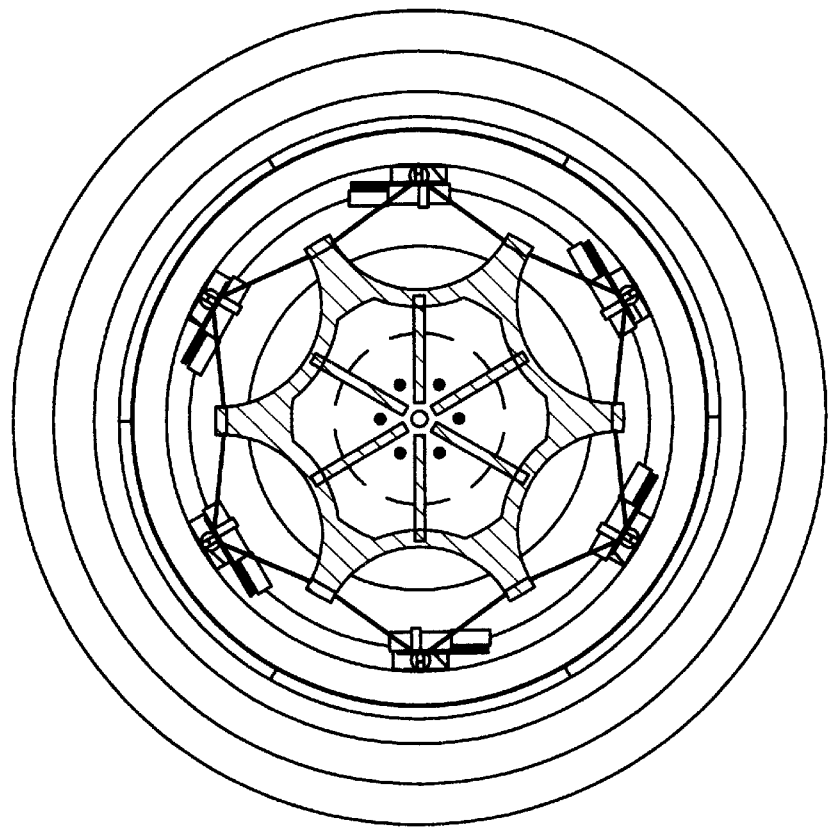

A reference design of the power conversion unit is illustrated, by way of example, in FIGS. 5(a) through 5(b). FIG. 5(a) is a front view of the aperture entrance, FIG. 5(b) is a side perspective view, FIG. 5(c) is another side view, FIG. 5(d) is a cross-sectional view along the line A—A of FIG. 5(c), FIG. 5(e) is a cross-section view along the line B—B of FIG. 5(d), and FIG. 5(f) is an overall view. The reference a in FIG. 5(a) is about 4.0 inches, and the references b, c and d in FIG. 5(b) are about 45.1, 13.9 and 55.3 inches, respectively. These dimensions, and the dimensions shown elsewhere in this description, are for a reference design of a 30–40 KW system which is approximately 46 inches in diameter and 55 inches long with a mass of about 300 Kg (with storage). However, the invention is not limited to these dimensions, and other configurations are of course readily applicable.

Also, in an effort to facilitate understanding of the invention, the description below is set forth in terms of designated subsystems of the power conversion unit. These subsystems, as shown in FIG. 5(d), are the receiver/emitter subsystem 501, the aperture reflector subsystem 502, the side and rear thermophotovoltaic (TPV) conversion subsystem 503, the control subsystem (not shown), and the housing and cooling subsystem 505. The receiver/emitter subsystem 501 includes a structural housing, thermal storage material, and thermal conductors. Part of the structural housing is designated to receive the solar energy, part is designated to store thermal energy, and part is designated to emit IR at the required wavelength. The aperture reflector subsystem 502 includes an aperture reflector, an aperture nozzle, aperture shutters, and an aperture cooling system. Its function is to direct the sun's energy into the receiver cavity. The side and rear TPV conversion subsystem 503 includes PV cells, an IR filter, cell shutters, a cell mounting and cooling plate, an IR reflector, and high temperature structural support. The control subsystem (FIG. 19) includes a processor, sensors and actuator interface components. The functions of the control subsystem are to control the aperture shutters and the PV cell filter/shutters, monitor the temperature sensors, control the cooling valves, and regulate the generated power level to meet the demand load. The housing and cooling subsystem 505 includes the structure components which hold the internal components together and insulation to reduce the loss of thermal energy. This subsystem 505 also functions to keep the cells and other low temperature components at their operating temperature.

Each of the subsystems of the power conversion unit is described in turn below, followed by a description of the unit's operation.

Receiver/Emitter Subsystem

Figure 6C:
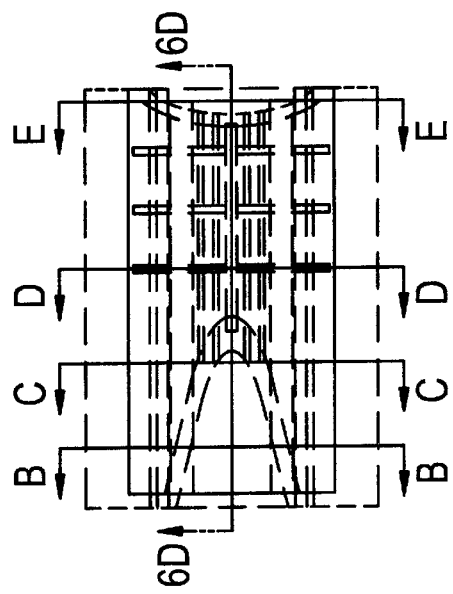
FIGS. 6(a) through 6(i) illustrate various views of the receiver/emitter subsystem of the present invention.
Figure 6D:
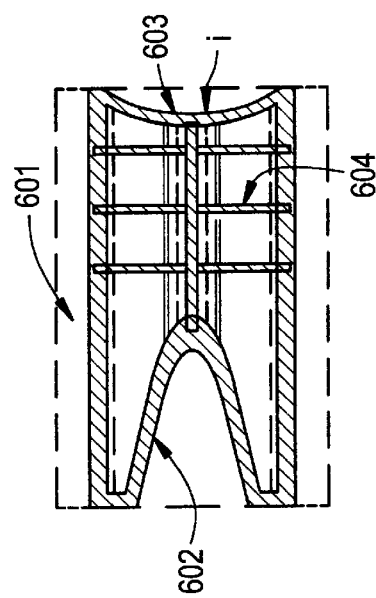
Figure 6A:
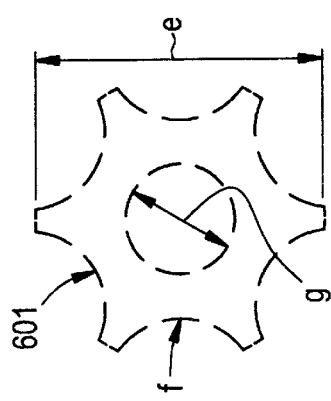
Figure 6B:
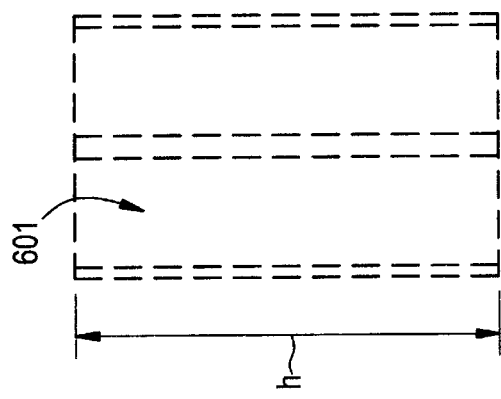
Figure 6E:
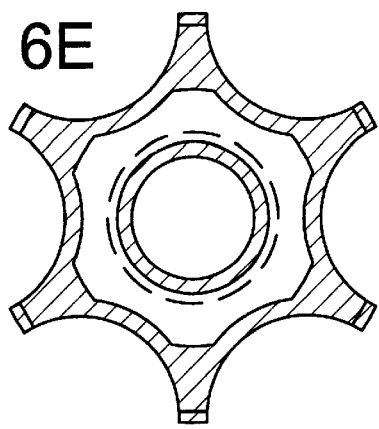
Figure 6F:
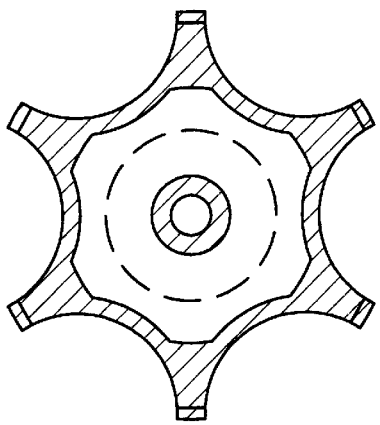
Figure 6G:
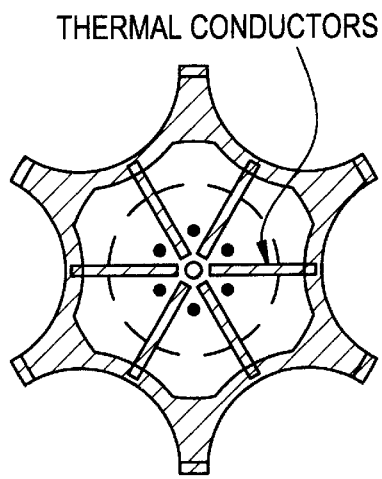
Figure 6H:
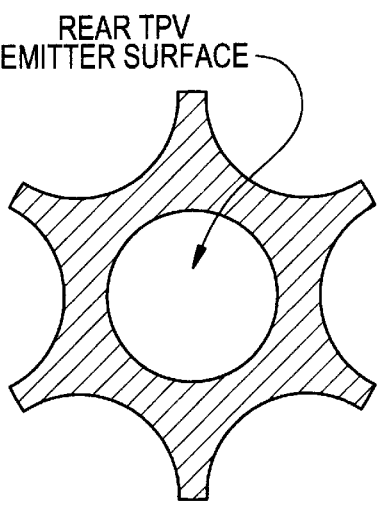
Figure 6I:
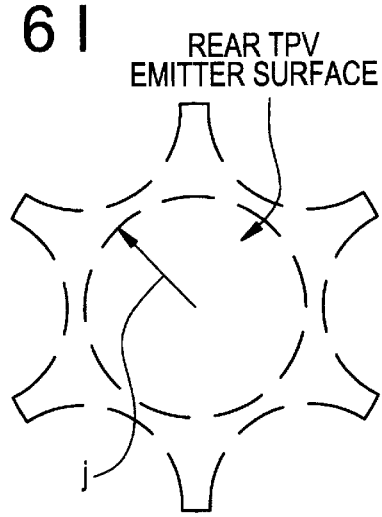

The purpose of the receiver/emitter subsystem is to collect the sun's irradiance over all its wavelengths, covert the same to thermal energy, store the thermal energy, conduct the thermal energy to the emitter surface, and radiate the energy at the required frequency. The receiver/emitter subsystem is shown, by way of example, in FIGS. 6(a) through 6(i). The receiver/emitter housing is constructed of a material that can withstand high temperatures such as, for example, silicon carbide, silicon carbide with boron silicate coating, zirconium oxide with boron silicate coating, and so forth. FIG. 6(a) is a front view of the emitter/receiver, in which e,f and g are about 29.43, 8.00 and 11.31 inches, respectively, and FIG. 6(b) is a top view, in which h is about 42.00 inches. Reference numeral 601 denotes an emitter surface. FIG. 6(c) is a side view, and FIGS. 6(d) through 6(h) are cross-sectional views taken along sectional lines A—A through E—E, respectively, of FIG. 6(c). In FIG. 6(d), reference numeral 601 denotes the side emitter surface, reference numeral 602 denotes a receiver surface, reference numeral 603 denotes a rear emitter surface, and reference numeral 604 denotes a thermal conductor. In FIG. 6(g), reference numeral 604 again denotes the thermal conductor, and in FIG. 6(*h*), reference numeral 603 again denotes the rear emitter surface. Finally, FIG. 6(*i*) shows a rear view having the rear emitter surface 603, in which j is about 8.97 inches. Again, all dimensions are exemplary only.

Figure 7A:
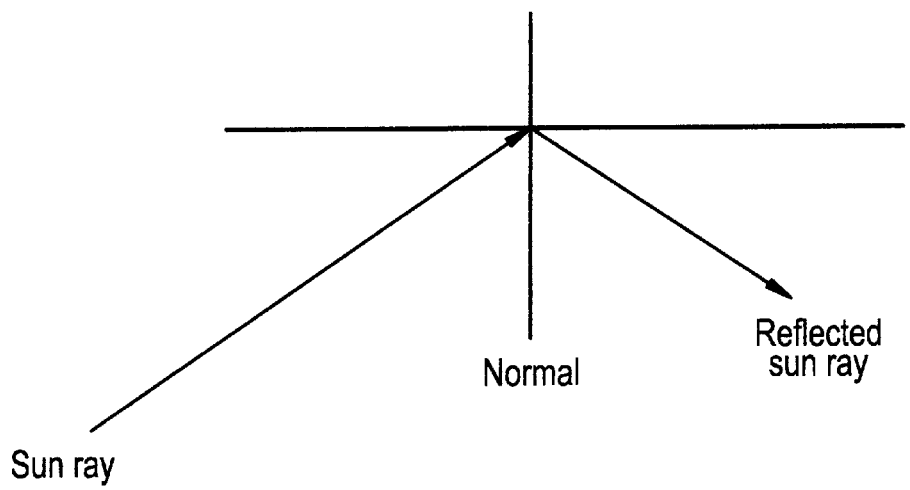
FIGS. 7(a) and 7(b) show the sun ray reflections within a receiver cavity.
Figure 7B:
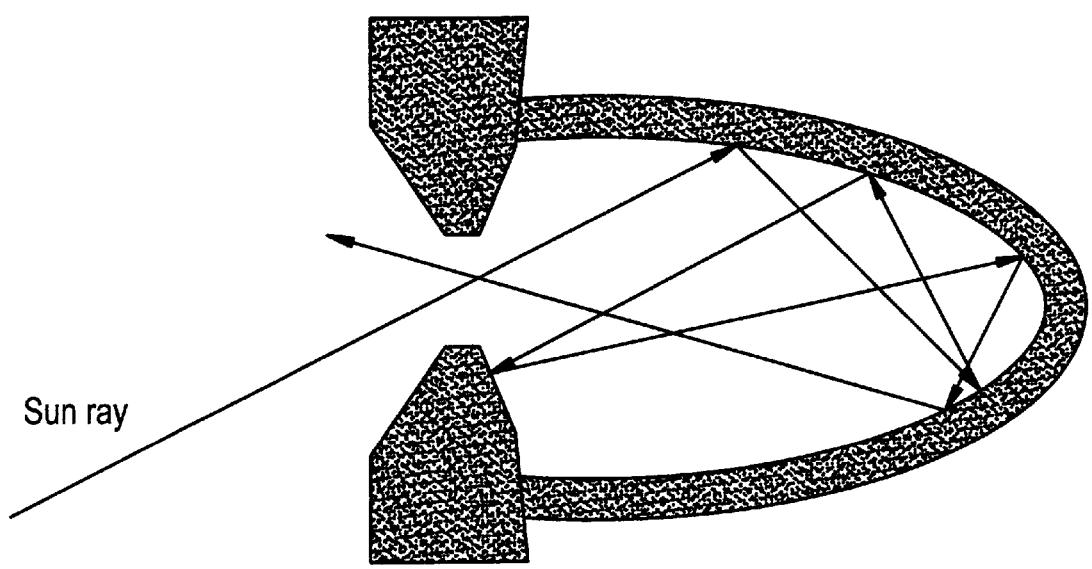

The receiver surface 602 is curved such as to minimize losses resulting from reflections and radiation. In general, as a sun ray enters the receiver, it is incident upon the side of the receiver at an angle off of normal. The energy that is not absorbed in the receiver will be reflected in a diffused pattern at a nominal angle which is opposite the incident angle as shown in FIG. 7(*a*). As shown in FIG. 7(*b*), this will take the energy deeper until it is incident on another part of the receiver surface. For most of the sun rays that enter the receiver cavity, many reflections (and thus partial absorptions) will occur before the ray might exit from the receiver cavity.

Figure 8A:
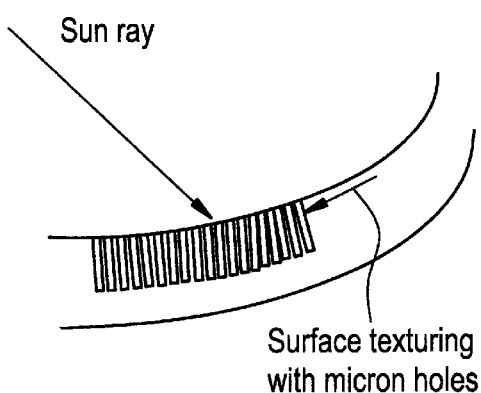
FIG. 8(a) is a view for explaining surface texturing using micron holes.
Figure 8B:
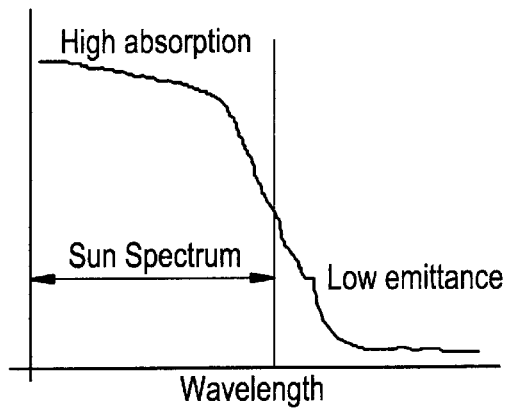
FIG. 8(b) shows the absorption/emittance characteristics of the receiver surface.

Also, to further increase the system efficiency, the surface of the solar receiver is preferably designed to reduce loss of IR radiation energy from the receiver cavity. This is done by surface texturing and coating the surface to change the emittance/absorption as a function of wavelength. The emittance/absorption is controlled by both surface texturing with micron geometric holes and/or coating with species material, such as with tungsten, etc. which have an emittance spectrum as illustrated in FIG. 8(*b*). The emittance can also be controlled by boring micron size holes in the surface as shown in FIG. 8(*a*). The small holes capture solar photons but will not emit long wave IR radiation since the tiny cavity cross-section dimensions are smaller than the above bandgap radiation wavelength. As illustrated in FIG. 8(*b*), the resulting surface has a high absorption in the solar region and a low emittance in the higher IR wavelength.

Figure 9:
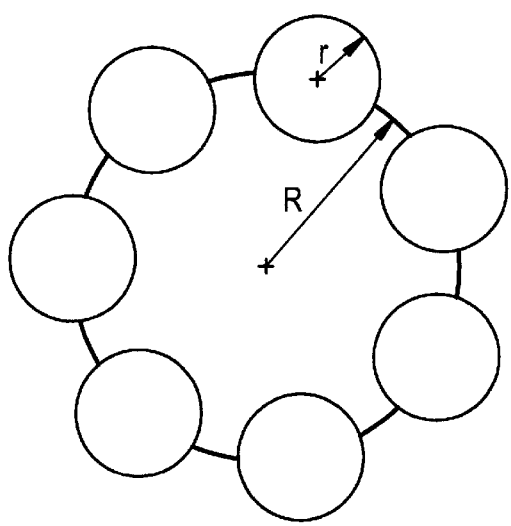
FIG. 9 is a view for comparing the surface area of the circular shapes of the present invention with that of a cylinder.

As shown in FIGS. 6(*a*) and 6(*d*), the side and rear emitter surfaces 601 and 603 have circular curvatures. This provides two unique advantages over the designs of other systems. First, when the radiating surface is limited to a narrow bandwidth, the total radiated power is very small. The circular shape increases the surface area over a cylindrical surface of the outside diameter as illustrated in FIG. 9(*a*). The approximate increase of the emitter surface area is a factor of 2.5 to 3. Second, the radiating intensity pattern from the surface tends to be somewhat specular. (See, for example, Sparrow, E. M., Cess, R. D., "Radiation Heat Transfer," Brooks/Cole, 1996.) That is, the angular width of the intensity pattern depends upon the surface material and surface texture. Due to the circular shape and the radiation intensity pattern, the radiated energy will be focused or concentrated around the center of the sphere.

Figures 10, 11:
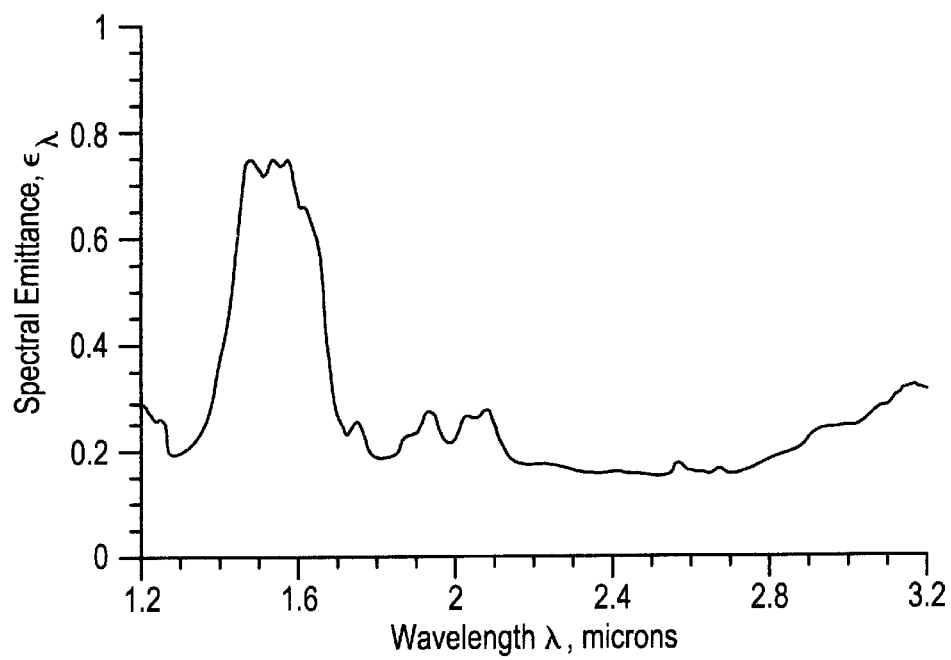
FIG. 10 shows the spectral radiation of the receiver surface.
FIG. 11 is a table listing, as examples, candidate thermal storage materials.

One method of controlling the spectrum band of the radiating surface is by covering it with a rare-earth material, such as erbium, holmium, neodymium or their oxides. The purpose of the rare earth material is to have its emission band match the optimum operating wavelength region of various PV cells that can be used in different configurations. The choice of the design operating temperature of the side emitter surface and rear emitter surface is dictated by the operating wavelength choice. The source of the basic heat (solar, nuclear, reactor heated fluid, etc.) dictates the best operating temperature. The rare earth material is placed on a substrate such as platinum (developed by NASA and others). This substrate is bonded to the surface. An example of the spectral radiation of this assembly is shown in FIG. 10. (See, for example, Chubb, D. L., Lowe, R. L., Good, B. S., "Radiative Performance of Rare Earth Garnet This Film Selective Emitters," The First NREL Conference on Thermophotovoltaic Generation of Electricity, Copper Mountain, CO, 1994.)

Another method of determining and tailoring the surface radiation band is through surface texturing to prevent long wavelength emission via prohibiting electromagnetic wave emission from textured cavities (boring micron size holes in the surface) of aperture dimensions smaller than the wavelength one doesn't wish to be emitted. This wavelength value is slightly larger than the one corresponding to the photon energy matching the PV cell bandgap value.

Figure 12:
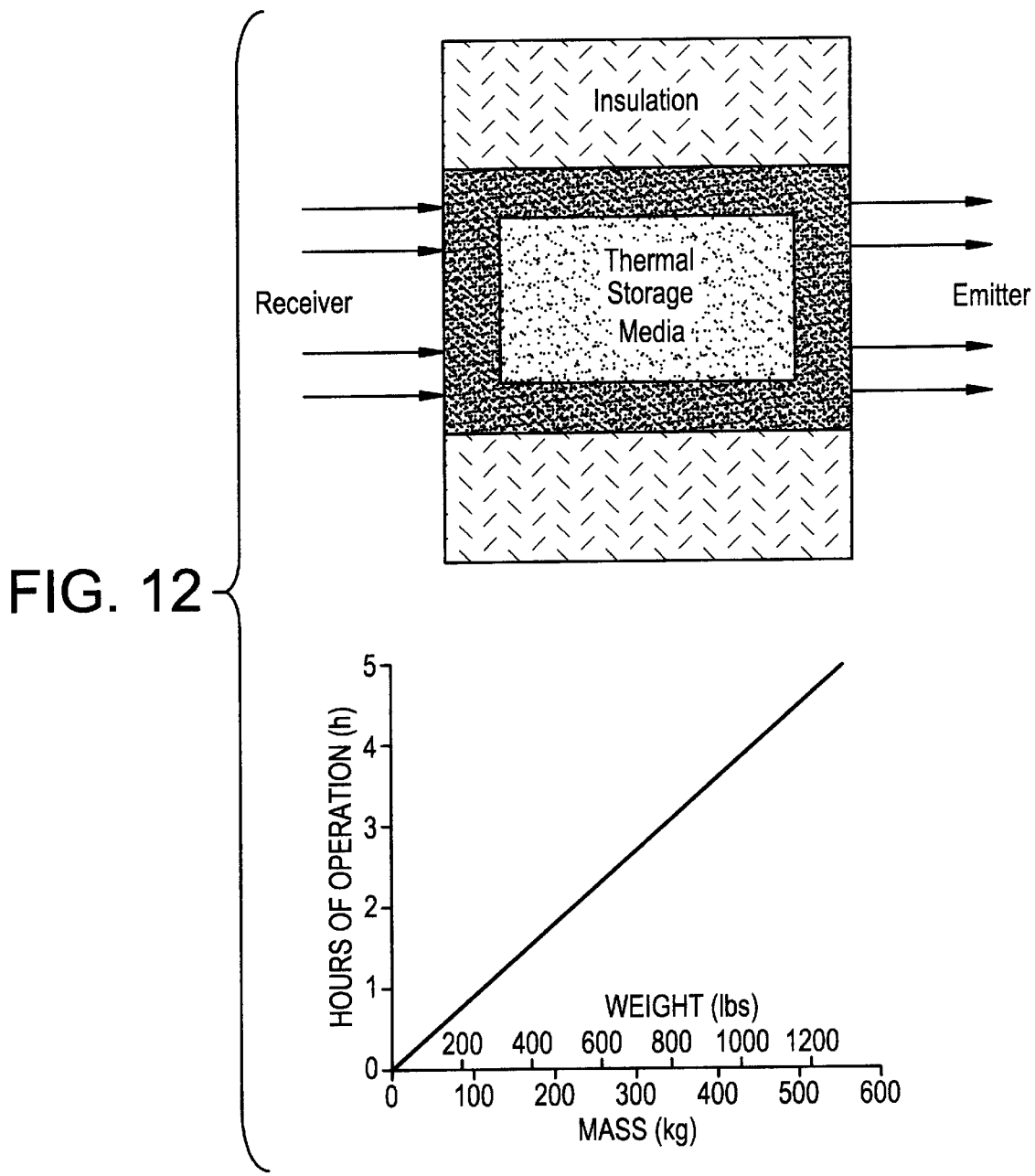
FIG. 12 illustrates the thermal storage media and the storage time vs. mass of a space silicon storage system.

The interior of the chamber contains a thermal storage material. FIG. 11 is a table showing a list of possible thermal storage materials. The material is heated through the melting point, and thus a large amount of energy can be stored in a small mass as illustrated in FIG. 12 which shows a STPV system using silicon. It is important for good performance to maintain the thermal storage material near the same temperature. Since the thermal storage materials are poor conductors of heat, thermal conducting rods 604 are embodied in the back side of the receiver as shown in FIG. 6(*d*). As the emitter surface emits energy, the thermal storage material next to the back side of the emitter will cool, but the inner part of the thermal storage material will be at a higher temperature. Additional thermal conducting rods are embodied in the back side of the emitter as also shown in FIG. 6(*d*) that conduct heat from the center of the thermal storage unit to the emitter surface.

The operation at the temperature of fusion (melt-change) of state with a resource of sufficiently high thermal mass readily allows for a fixed thermal distribution through the system and hence each piece can be optimally designed.

Aperture Reflector Subsystem

Figure 13F:
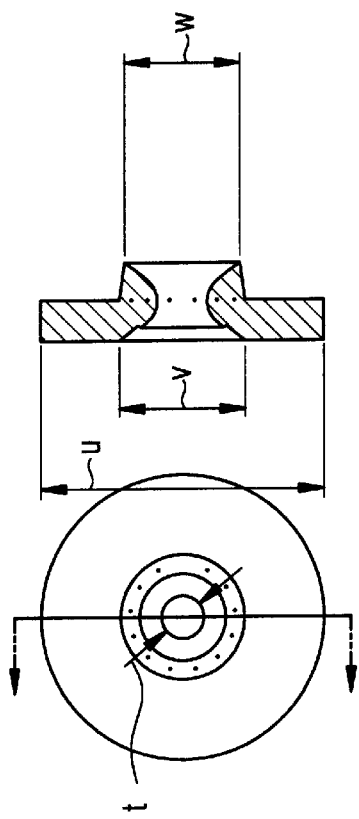
Figure 13G:
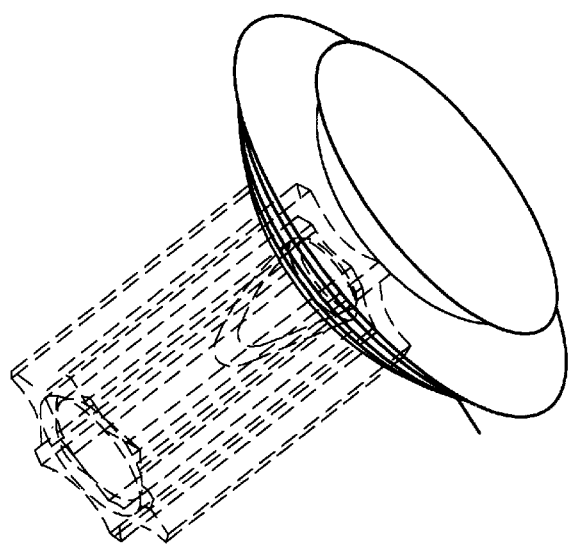
Figure 13E:
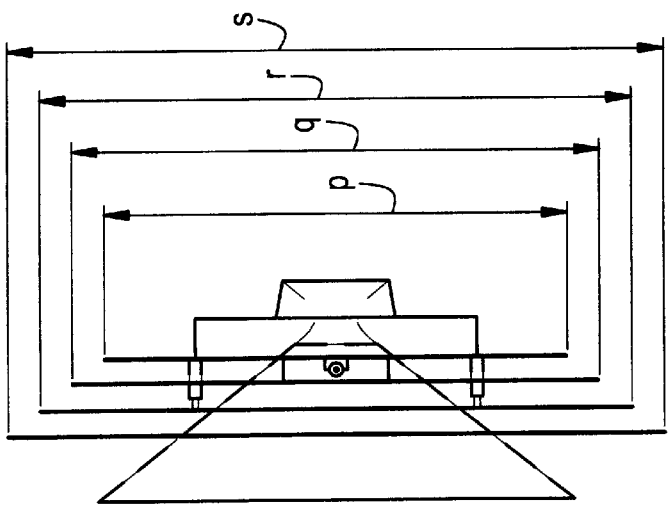

The function of the aperture reflector subsystem is to reduce spillage of the reflective energy from the concentrator and reduce IR losses from the receiver cavity. The components of this subsystem are shown in FIG. 13(*a*) through 13(*g*). FIG. 13(*a*) is a front view of the subsystem with the aperture in the open position, in which k (outside dimension of the cooling fans) is about 61.94 inches, and FIG. 13(*b*) is a cross-section view of the same with the aperture shutters in the open position, in which l and m (outside and inside dimensions of the reflector assembly) are about 44.8 and 8 inches, respectively, and in which reference numeral 1301 denotes the aperture shutters in the open position and reference numeral 1302 denotes the aperture nozzle. FIG. 13(*c*) is a front view with the shutters in the closed position, and FIG. 13(*d*) is a cross-section view of the same with the shutters in the closed position, in which n and o are about 25.75 and 7.46 inches, respectively, and in which reference numeral 1303 denotes the aperture actuators. FIG. 13(*e*) is a side view showing the dimensions of the aperture cooling plates, in which p, q, r and s are about 43.56, 49.69, 55.82 and 61.94 inches, respectively. FIG. 13(*f*) is a detailed view of the aperture nozzle, in which t, u, v and w are about 4.00, 26.53, 11.57 and 10.00 inches, respectively. FIG. 13(*g*) is an overall view of the subsystem. Once again, all dimensions are exemplary and for illustrative purposes only.

The aperture reflector reflects energy that would miss the aperture opening back to the aperture opening. The concentrator reflector surface has surface errors associated with it that spread the beam as it approaches the aperture opening. The reflector redirects some of this energy back toward the center. This assembly includes, for example, a reflective surface of micro-sheet glass that is bonded to a cooling plate such as a copper plate. Around the outside of the reflector are radiating fins which function to cool the reflector assembly. The cooling plates are, for example, black treated copper plates. The heat from the reflector assembly is conducted to these plates and then radiated to the surrounding environment.

The losses out of the receiver cavity are directly proportional to the size of the aperture opening, i.e., the smaller the aperture opening, the more of the reflected energy from the concentrator is lost outside the receiver cavity. The function of the aperture nozzle is to reflect this energy into the receiver cavity and still have a small aperture opening. This is accomplished by the shape of the aperture nozzle. The cross-sectional view of FIG. 13(f) shows the curved configuration of the aperture nozzle. The shape is optimally curved such that the sun rays hitting the aperture reflector and aperture nozzle will be reflected into the receiver cavity. The back of the aperture nozzle is also shaped to reflect back the IR radiation from the receiver while at the same time not blocking sun rays from entering the cavity. The aperture nozzle is made of a high temperature insulating material, for example, alumina enhanced thermal barrier (AETB), zirconia, slip-cast fused silica (Cotronics fusil foam 50), etc.

The function of the aperture shutters are to stop/reduce the IR energy loss from the receiver cavity when there is no insolation being reflected from the concentrator, such as during cloud cover or night for terrestrial applications or the eclipse part of the orbit for space applications. In the example, there are two confronting shutters as shown in FIG. 13(b). The shutters are made of a high temperature material similar to the aperture nozzle. Four small linear actuators which move the aperture reflector away from the aperture nozzle are also provided, and as shown in FIG. 13(d), when the aperture reflector has reached this position, the shutters close and overlap.

Side and Rear TPV Conversion Subsystem

Figure 14A:
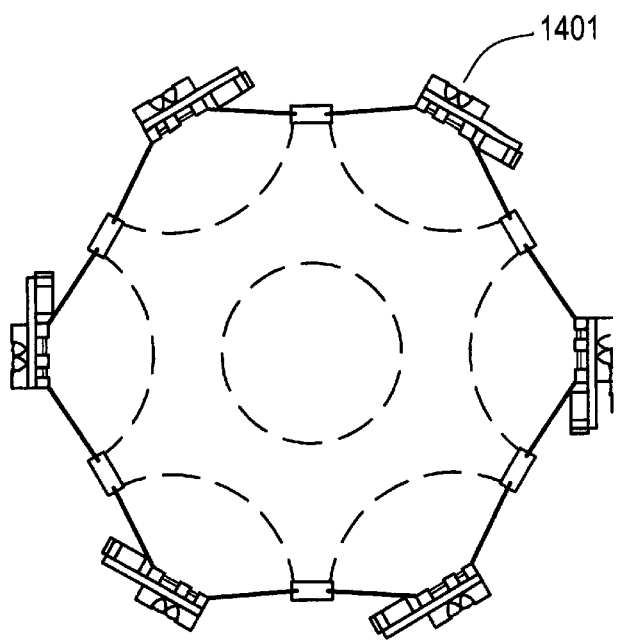
FIGS. 14(a) through 14(h) illustrate various views of the side TPV conversion subsystem of the present invention.
Figure 14B:
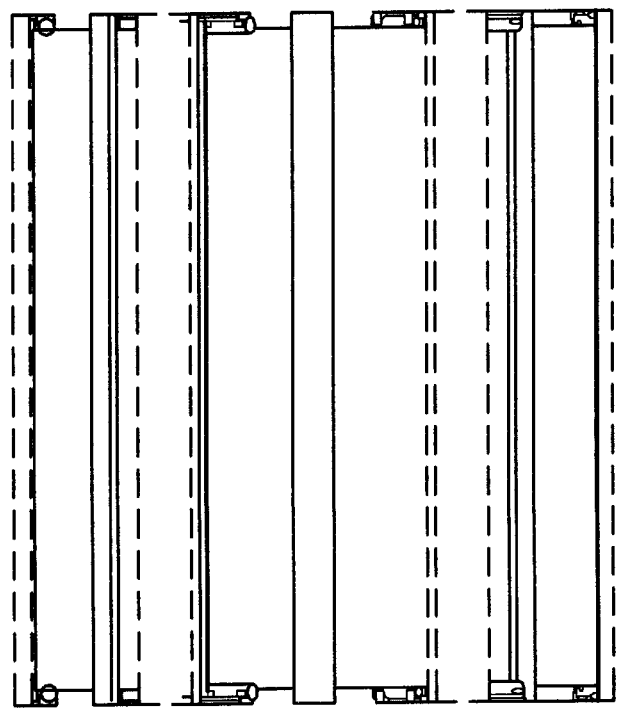
Figure 14C:
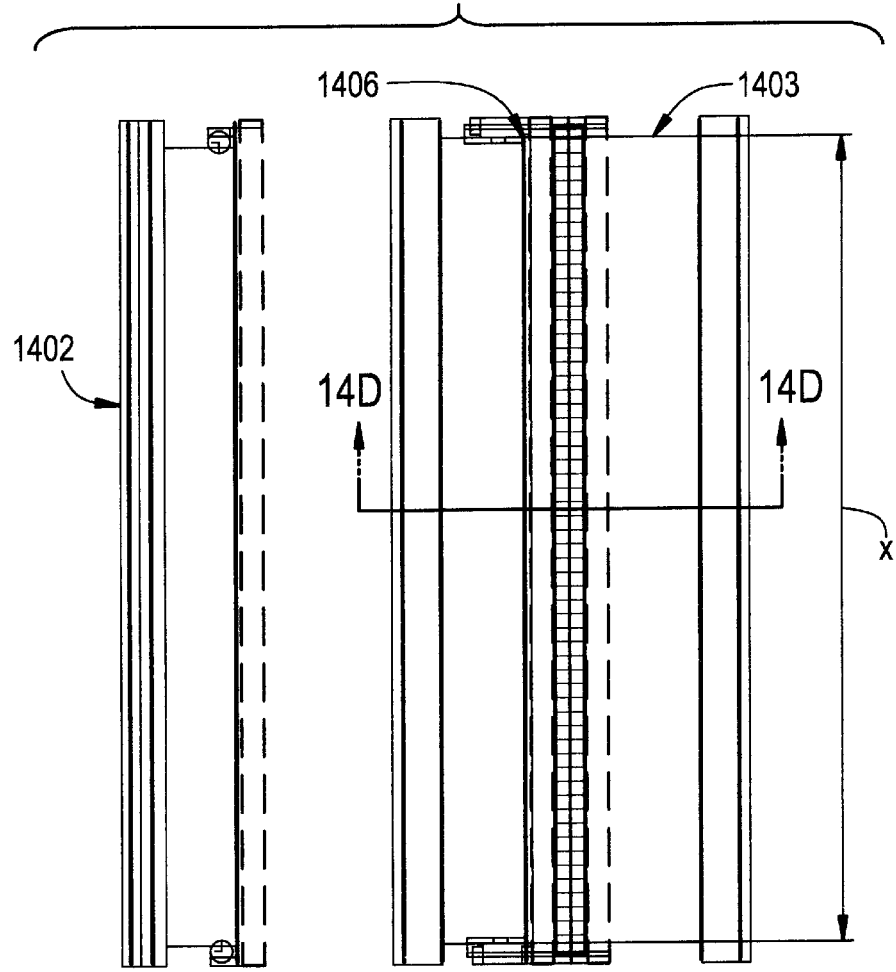
Figure 14D:
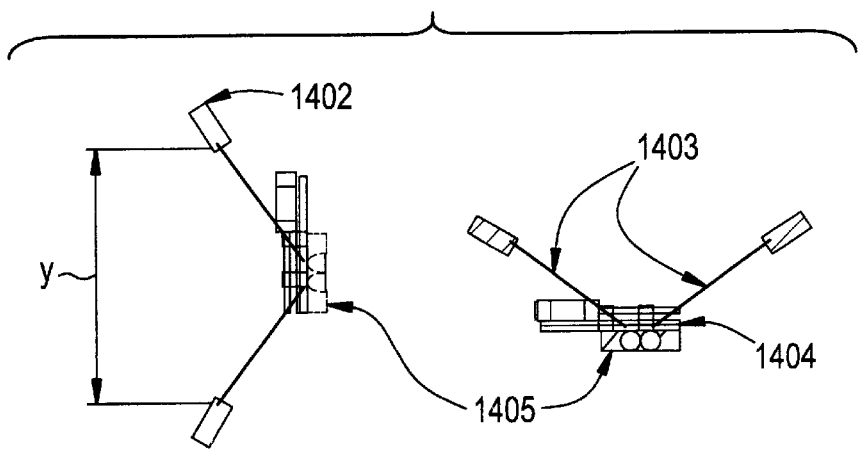

The function of the side and rear TPV conversion subsystem is to concentrate the IR radiation energy on PV cells for conversion to electric energy. It includes IR reflector assemblies, an IR filter and shutters, and PV cells mounted on a cooling plate. FIGS. 14(a) through 14(h) illustrate different views of the side TPV conversion. FIG. 14(a) is a front view showing the six mounted side TPV conversion units 1401, and FIG. 14(b) is a top view of the same. FIGS. 14(c) and 14(d) show different views of an individual TPV conversion unit, in which x and y are about 42.0 and 13.0 inches, respectively, and in which reference numeral 1402 denotes a high temperature insulator interface assembly, reference numeral 1403 denotes an IR reflector assembly, reference numeral 1404 denotes an IR filter and shutter assembly, reference numeral 1405 denotes a PV cell and cooling assembly, and reference numeral 1406 denotes an IR shutter drive mechanism assembly. FIGS. 14(c) and 14(f) show different views of the IR filter/shutter assembly, in which z and aa are about 43.0 and 3.1 inches, respectively, and in which reference numeral 1407 is an IR filter, reference numeral 1408 is a heat conducting spacer plate and reference numeral 1409 is a filter cooling plate. FIGS. 14(f) and 14(g) show the PV cells and cooling assembly including a cell mounting plate, in which ab, ac, ad and ae are about 4.0, 1.0, 44.0 and 41.9 inches, respectively, and in which reference numeral 1410 denotes the PV cells and reference numeral 1411 denotes a cooling vane. The illustrated dimensions are once again examples only.

The high temperature insulator interface assembly 1402, as shown in FIGS. 14(c) and 14(d), isolates the high temperature receiver/emitter subsystem and the IR reflector. It is made of, for example, zirconia board, AETB, and/or Fusil Foam 50 (slip-cast fused silica). The IR reflector reflects the IR radiation from the emitter surface toward the PV cells. It is curved very slightly to optimize the reflection of the non-specter emitter IR radiation such as to concentrate the IR radiation on the PV cells.

Figure 15A:
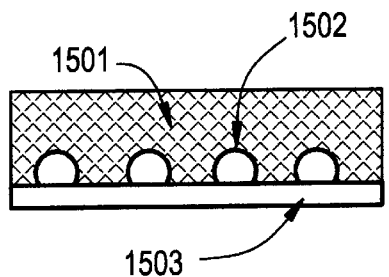
FIGS. 15(a) and 15(b) show the construction of the IR reflector of the present invention.
Figure 15B:
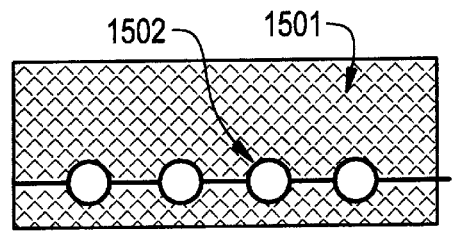

The function of the IR assembly, shown by way of example in FIGS. 14(c) and 14(d), is to contain the IR radiation in the emitter cavity. There are several options available for the construction of the reflector depending on the application (space or terrestrial). One option is to use a highly IR reflective material such as copper with one side highly polished and cooling coils or tubes mounted on the other side as shown in FIG. 15(a). In FIG. 15(a), reference numeral 1501 denotes insulation, reference numeral 1502 denotes cooling tubes, and reference numeral 1503 denotes IR reflecting metal. The cooling coils are used to keep the reflector material below its operating limit. For example, copper would have an operating temperature limit of around 600 degrees C. A second option, as shown in FIG. 15(b), is to use a block of insulation. If the insulating material has a lower operating temperature than the system operating temperature, cooling coils are located just below the surface as shown. These cooling coils keep the insulating material below the operating temperature limit.

The IR filter assembly has two main functions. The first part of the filter, as shown in FIG. 14(d), is designed to pass the desired frequencies to the PV cells and reflect back towards the emitter surface frequencies outside the bandpass frequencies. The filter reflects frequencies that are incident on the filter surface regions that are between PV cells, or over PV wiring, or outside PV cell regions. The other part of the IR filter is a total reflector, reflecting all frequencies back toward the IR emitter surface. The second function of the IR filter assembly is to function as a shutter in order to modulate the output power. If less power is required, one or more of the IR filters are partly or completely closed. The energy is reflected back and not lost from the system. Mounted on the edge of the IR filter is a cooling plate. This cooling system takes away the heat that is absorbed by the filter, keeping the filter at the optimum operating temperature. There are two setpoint temperatures for the filter. If the filter is open, the setpoint temperature is just a little higher than the operating temperature of the PV cells. If the filter is closed, the setpoint temperature is set at the survival temperature of the filter material or PV cells, whichever is lower. At each end of the filter assembly is a servo and guides which move the IR filter assembly in or out over the PV cells.

Figure 14E:
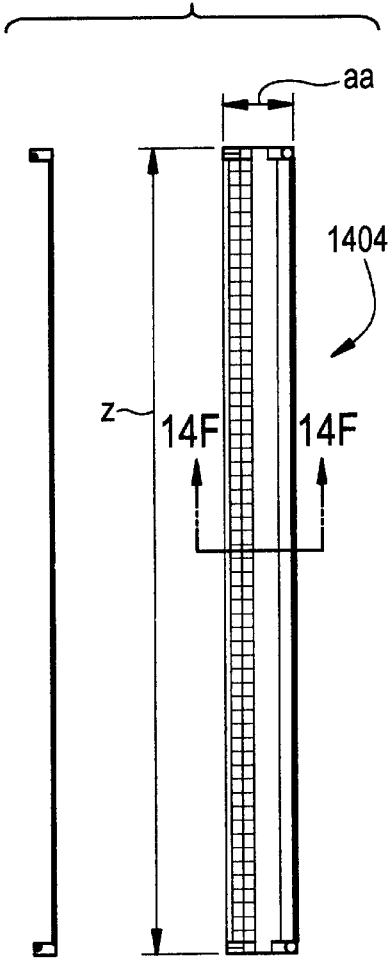
Figure 14G:
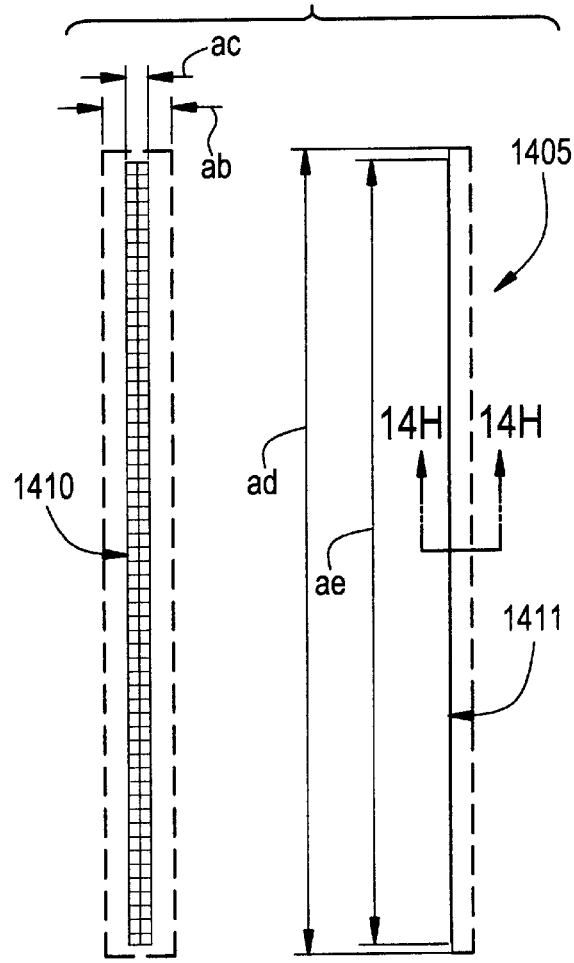
Figure 14F:
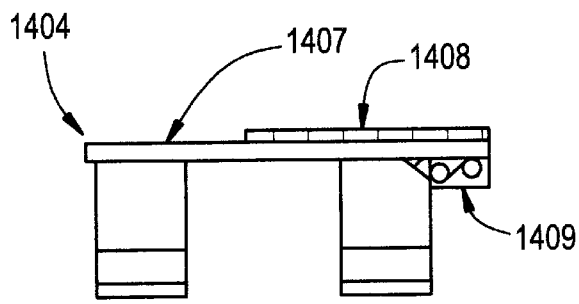
Figure 14H:
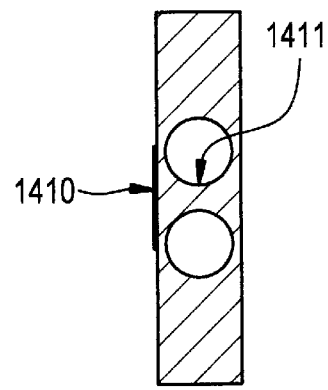

The PV cells are mounted on a copper plate as shown in FIG. 14(e). The PV mounting plate has two or more cooling holes drilled the length of the plate. Cooling fluid is passed through these tubes to remove the waste heat from the cells and maintain them at the optimum system operating temperature.

The construction and components of the rear TPV conversion system is the same as that of the side TPV conversion assembly except that it is round. The round rear TPV conversion system provides a means for fine power generation level control. As the IR filter closes, only a few cells are covered up at a time, and thus, the generated power level can be regulated to a finer level.

Figure 16:
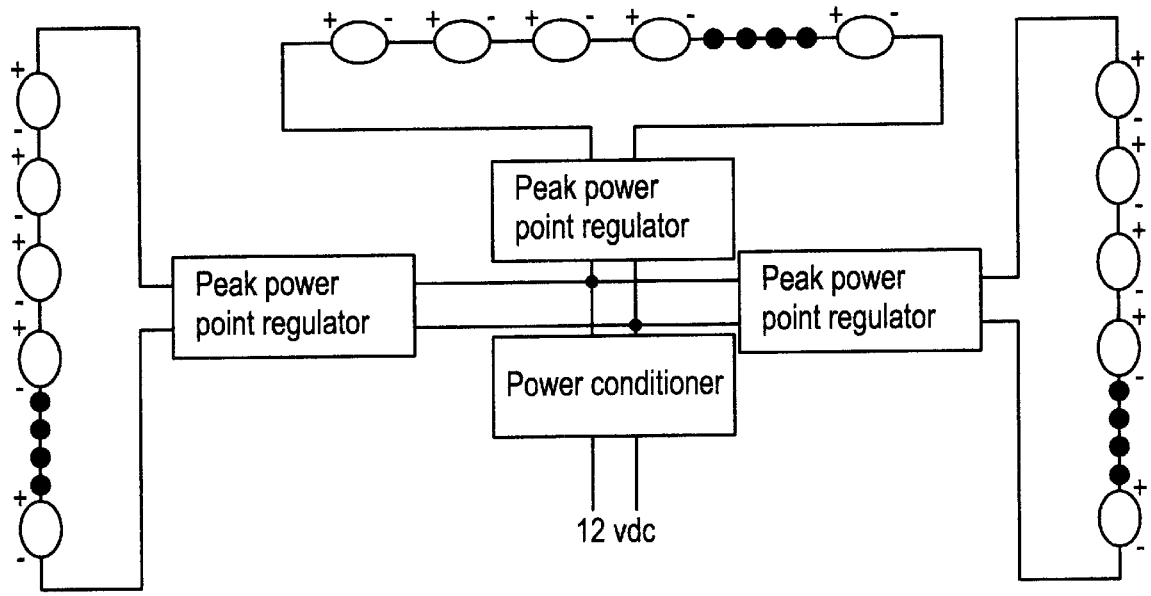
FIG. 16 shows an example of a cell connection for obtaining different output voltage levels.

The cell location in this design offers unique advantages over most other PV systems (and all concentrating PV systems known of) with regard to the flexibility in the manner of mounting the cells. All of the PV cells are located in one place (or one of several places) which allows PV cells to be easily connected into different configurations. Also, because of the system design, the relative flux level along the cells will be the same, i.e., the intensity will vary with temperature, but the relative intensity (high-to-low) will stay the same. The cells can therefore be configured so that the PV cells will operate at or near the peak power point all the time. Also, the PV cell can be configured to furnish different voltage levels. In space applications, spacecrafts require different voltage levels such as 5 v dc, 12 v dc, 28 v dc, etc.. The PV cells can be configured to provide the different voltage levels without requiring a massive power distribution system. For example, depending upon the concentration ratio and type of cell, the open circuit voltage can be around 0.8 volts. To obtain 5 v dc, 7 cells can be connected in series with a blocking diode. The blocking diode is required in the event that one cell in the series goes bad, a corresponding line does not draw all of the current. To obtain 12 v dc, 15 cells can be connected in series, as also shown in FIG. 16. In this manner, any desired voltage can be obtained. The output of each group of cells feeds a peak power point regulator 1601 so as to maintain the series of cells to operate at the peak power point. A voltage regulator 1602 is also provided to maintain the required output voltage.

Figure 17:
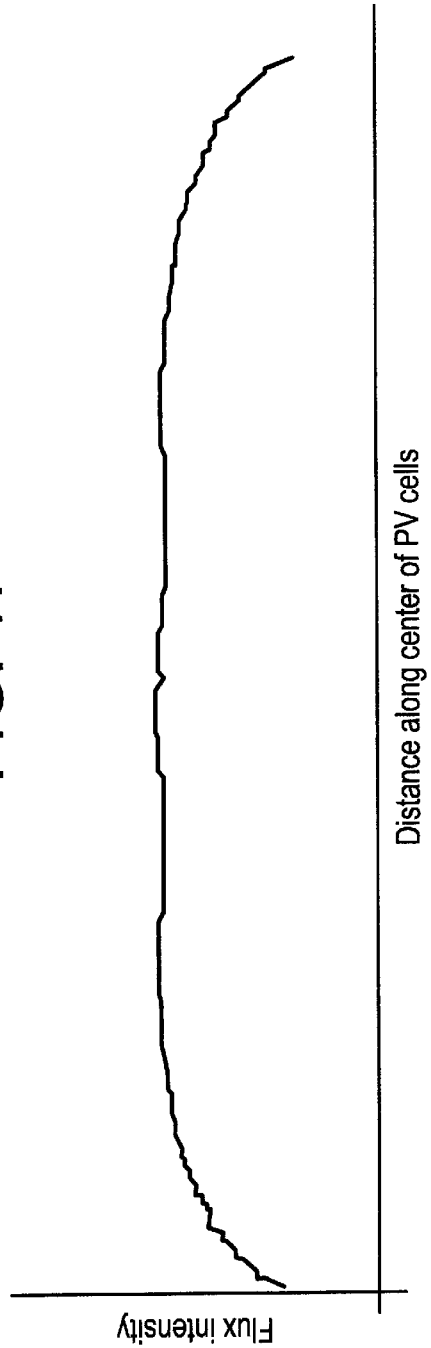
FIG. 17 shows the power intensity level along a cell line.

The power intensity along the cell line shown in FIG. 14(*e*) will be lower at each end as illustrated in FIG. 17. As the temperature varies, the power intensity would vary in the same manner as shown in FIG. 17. If the cells at the end are connected in series with the cell in the middle, then the power generation performance of the middle cells would be limited by the cells at the end. Due to the close proximity, the end cells can be connected together according to the power intensity level.

Figure 18:
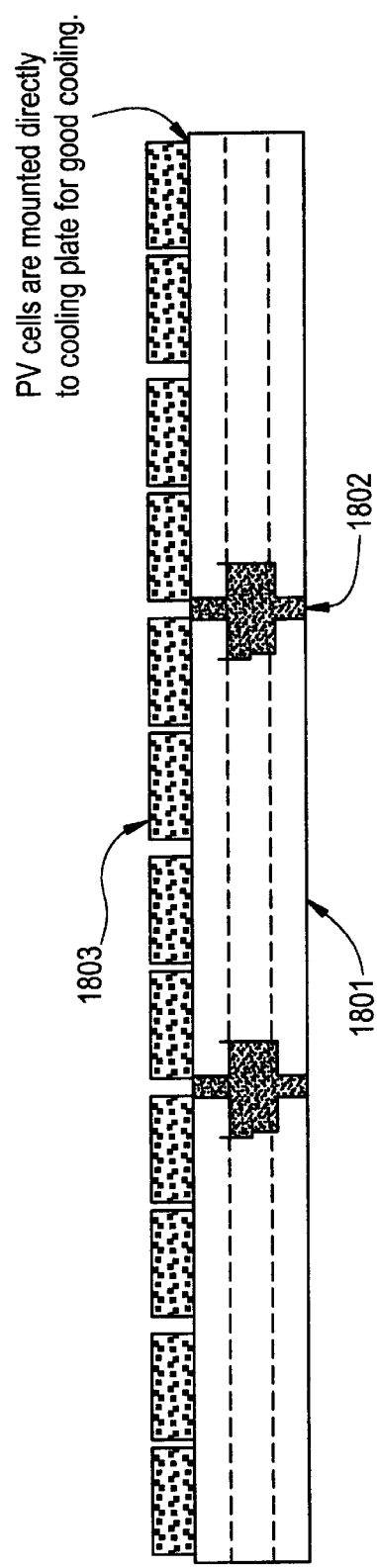
FIG. 18 shows the sectioning of a mounting/cooling block.

Again, due to the close proximity of the cells, another unique advantage of the invention resides in the flexibility in the physical mounting of the cells. For front contact cells, the back contact can be flow soldered to the mounting/cooling block and the front contact wired together. This would be a very low output voltage but would provide direct cooling for the cells. Also, as shown in FIG. 18, the mounting/cooling plate or block 1801 could be made in sections which are separated by insulation 1802. PV cells 1803 are mounted directly to the plate 1801 for good cooling. Each section could be wired in series to obtain the required voltage level. The area between the dashed lines in FIG. 18 denotes a cooling vane 1803.

Control System Subsystem

Figure 19:
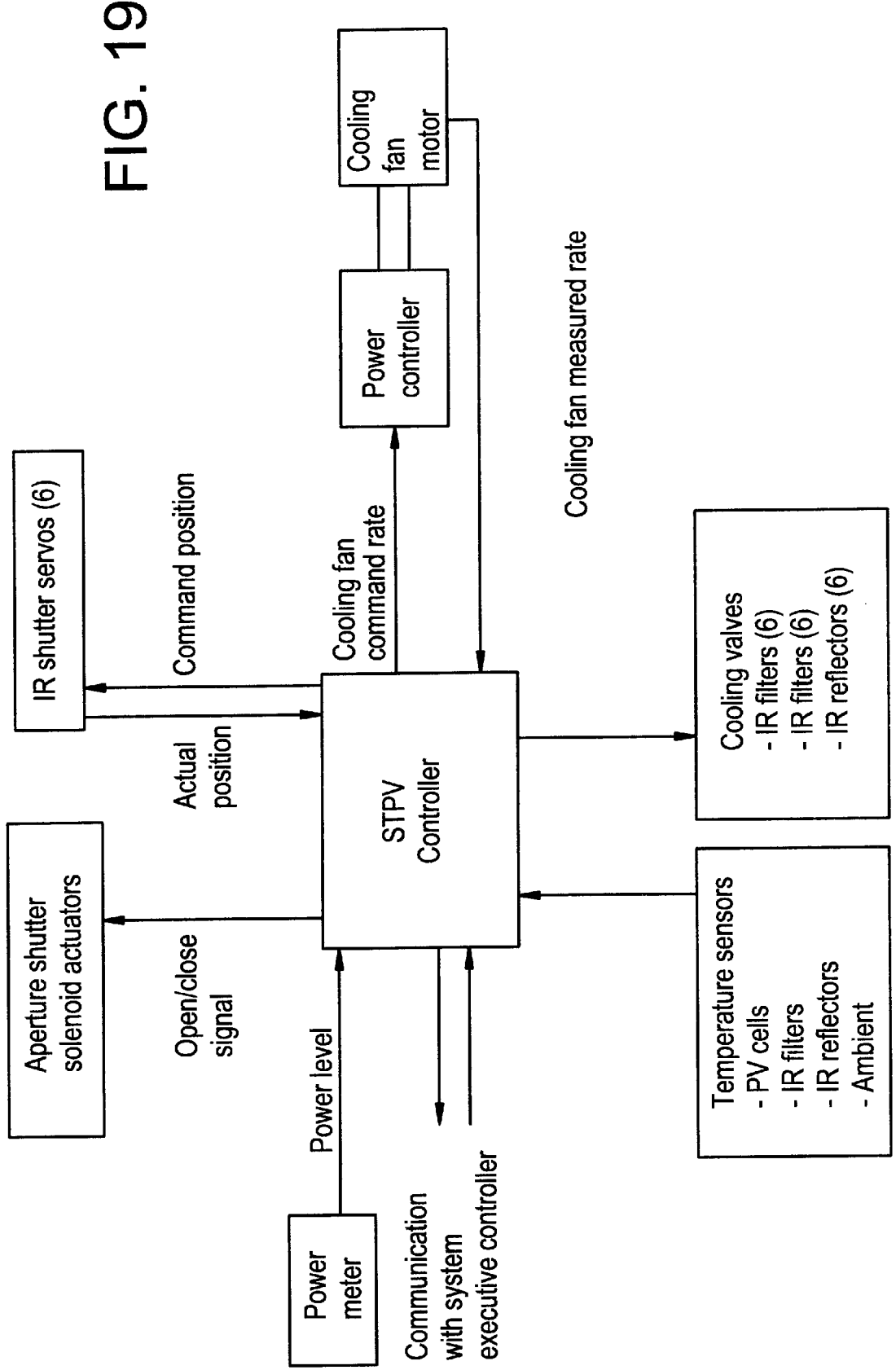
FIG. 19 illustrates the control system subsystem of the present invention.

The control system subsystem controls the power generation. It monitors various sensors, controls the position of servos, monitors the status of the operation of the system, controls flow valves, and provides operating status to an external controller as illustrated in FIG. 19. Temperature sensors are provided on the cell mounting block. The controller monitors the temperature of the cell block and the outside temperature. Based upon these temperatures, the controller calculates the optimum operating temperature of the cells. If the actual cell temperature is above this temperature, the controller opens the cooling value to the cell mounting block by an amount proportional to the temperature difference in order to decrease the cell temperature. If the actual cell temperature is below this temperature, the controller closes the cooling valve by an amount proportional to the difference in order to increase the cell temperature. The optimum temperature is given in U.S. patent application Ser. No. 08/700,577, filed Aug. 14, 1996, entitled "Adaptive Controller For Heat Engines," which is incorporated herein by reference.

Figure 20A:
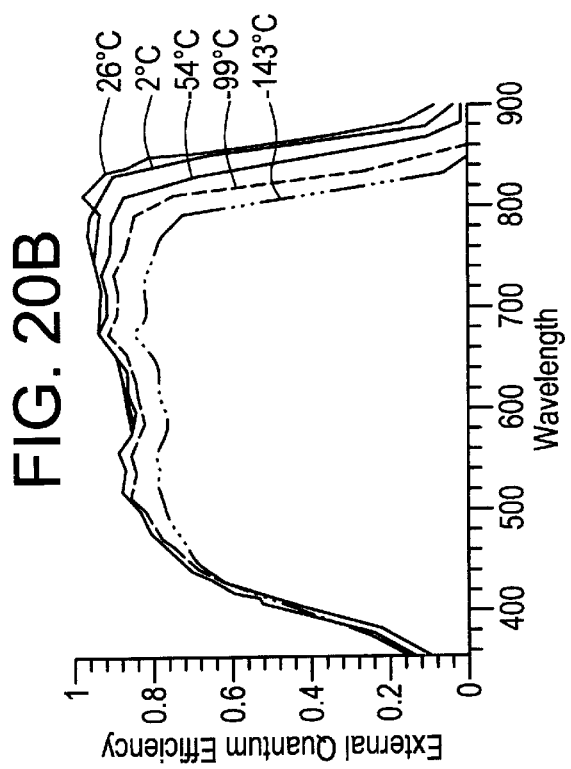
FIG. 20(a) shows the quantum spectral response of a flat plate GaAs/Ge substrate.
Figure 20B:
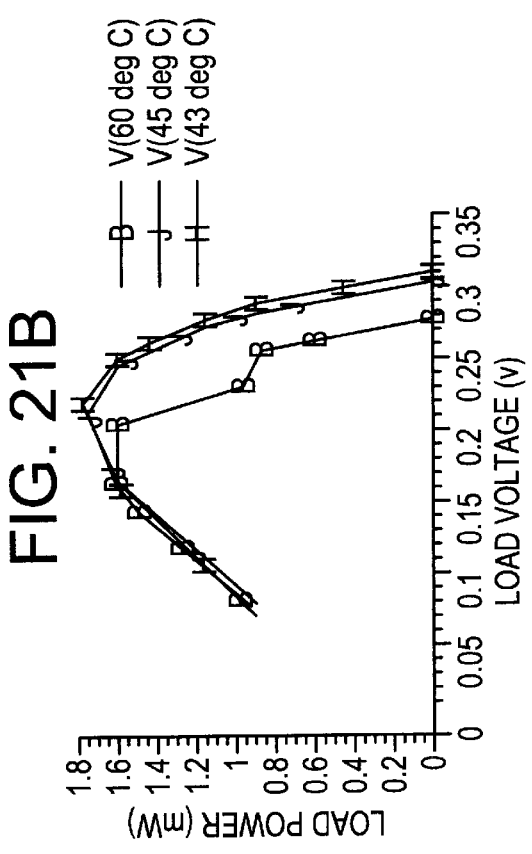
FIG. 20(b) shows the quantum spectral response of a GaAs top cell for a GaAs/GaSb tandem stack.
Figure 21A:
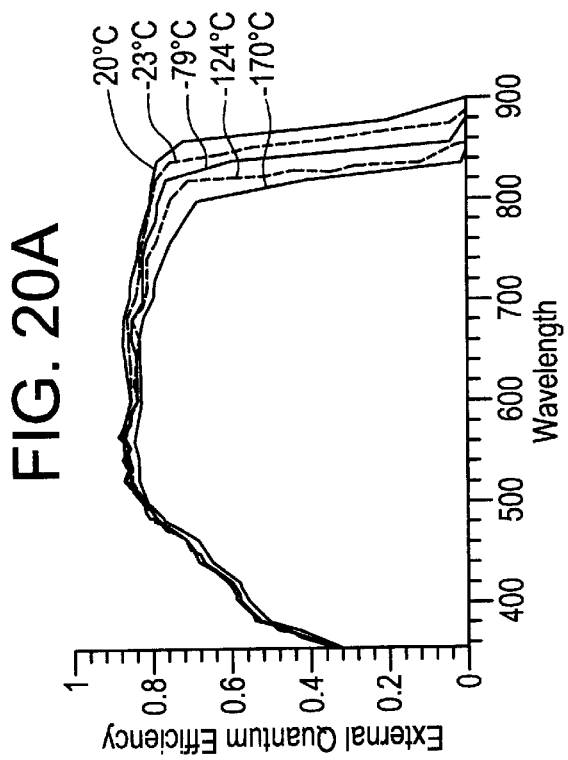
FIGS. 21(a) and 21(b) show measured cell short circuit current as a function of cell temperature.
Figure 21B:
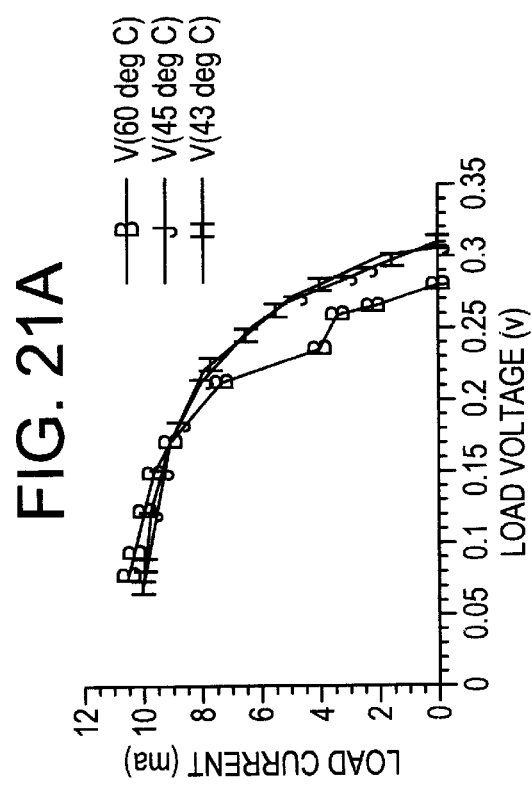
Figure 22A:
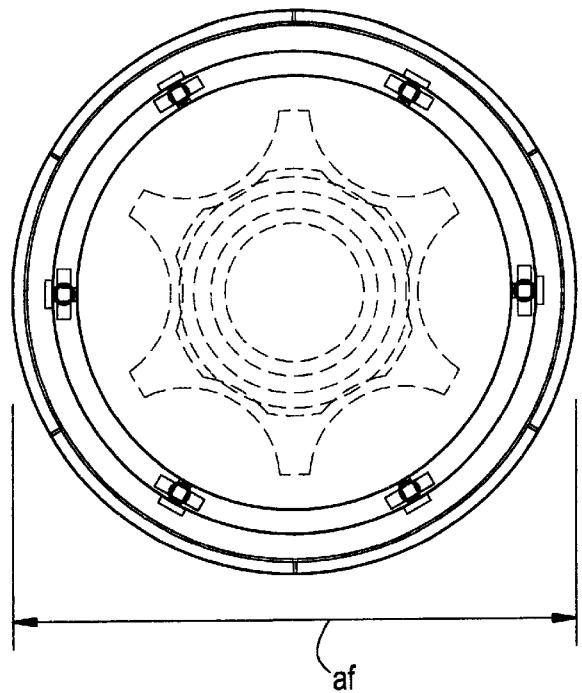
FIGS. 22(a) through 22(f) illustrate different views of the housing and cooling subsystem of the present invention.
Figure 22B:
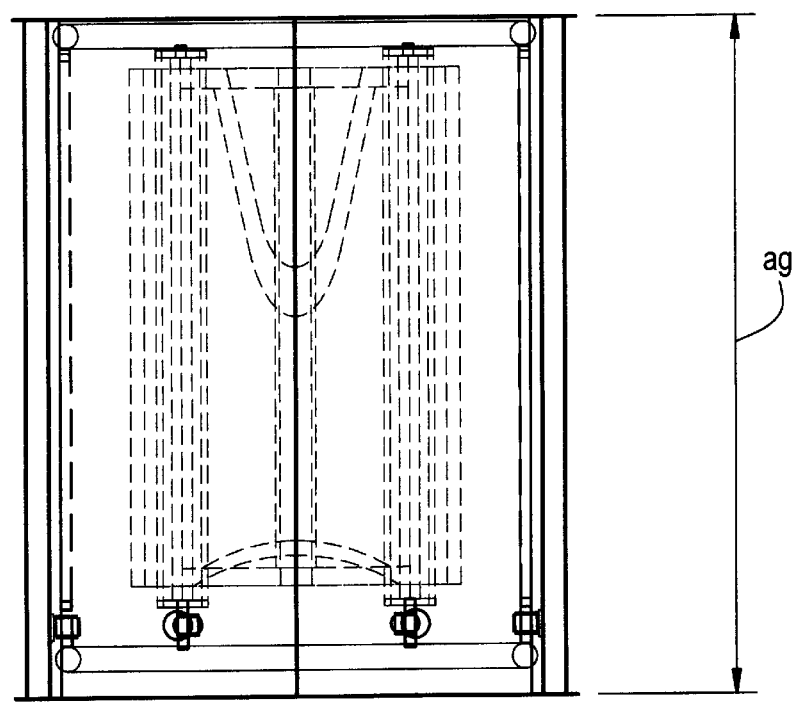
Figure 22C:
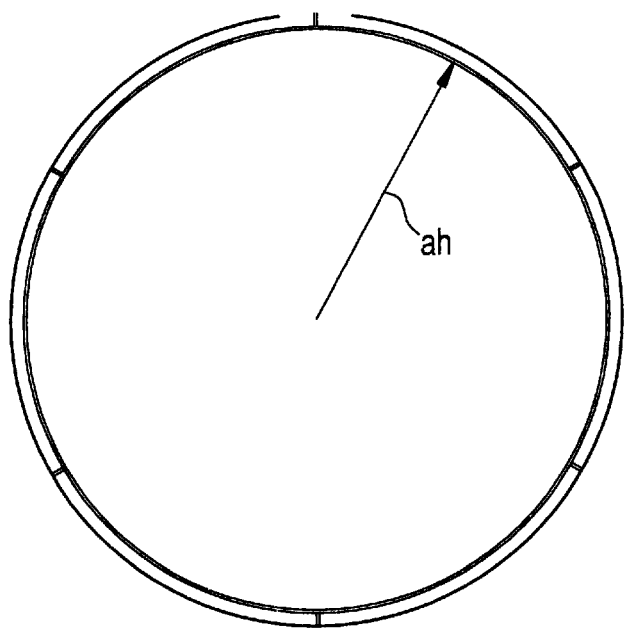
Figure 22D:
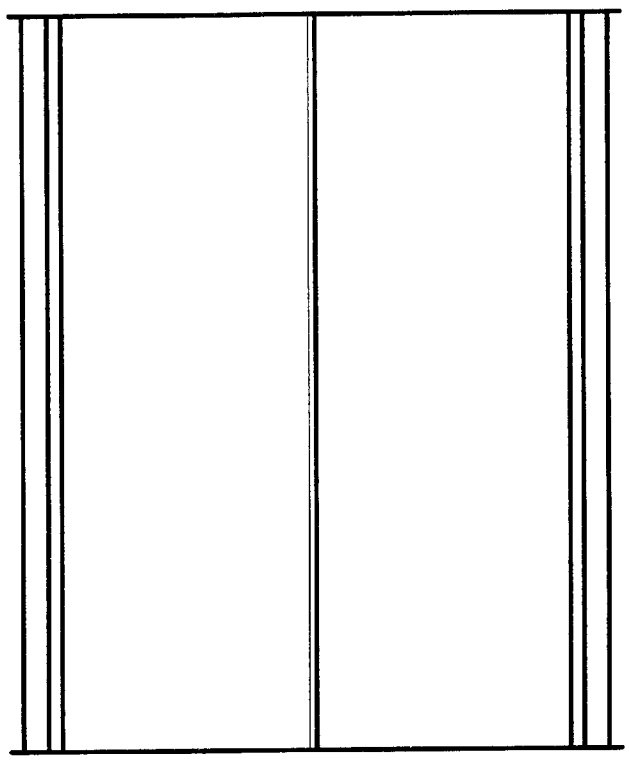
Figure 22E:
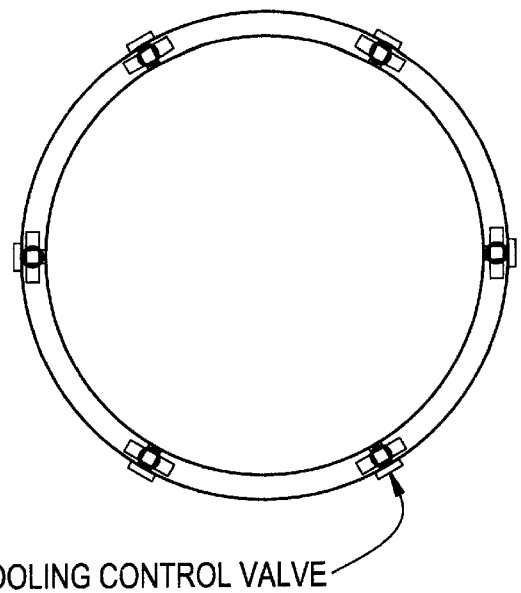
Figure 22F:
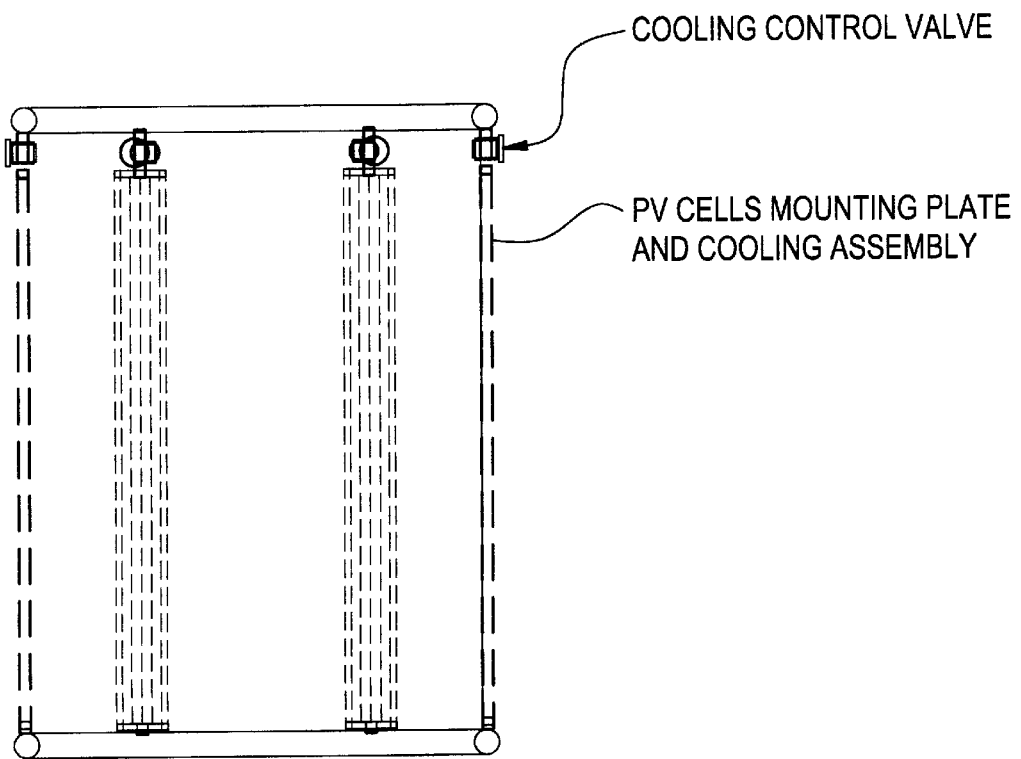

The characteristics of the PV cells are also taken into account in the design and operation of the system in order to increase the overall system efficiency. FIG. 20(*a*) shows the quantum spectral response of a flat plate GaAs/Ge (inactive germanium substrate), and FIG. 20(*b*) shows the QULT response of a GaAs top cell for a GaAs/GaSb tandem stack. As shown, the responsivity increases with cell temperature, and thus, the current for a given input will increase. This has been measured in the laboratory as shown in FIGS. 21(*a*) and 21(*b*) using different PV cells. The open circuit voltage still decreases with increasing temperature at a higher rate, and therefore the overall cell power performance still decreases. The system design and cell operating temperature are based upon the cell responsivity characteristics, the size and cost of the radiator system, the parasitics power required to cool the system, and the ambient temperature as discussed above.

The controller also controls the position of the aperture shutters and cell IR filter/shutters. When the controller receives a signal that the sun irradiance is not available, the controller will power the aperture shutter's servo motor to close. When the sun irradiance is again available, the controller will then reopen the aperture shutters. The controller also controls the position of the cell IR filter/shutters. Using sensor information, the controller calculates the amount of energy in thermal storage. A future power profile is furnished to it by an external controller. With this information, the controller makes a decision as to whether to generate maximum power or some lower power level.

Housing and Cooling Subsystem

The function of the housing and cooling subsystem is to support, protect and cool the STPV system. The housing and cooling subsystem is shown, by way of example, in FIGS. 22(*a*) through 22(*f*). FIG. 22(*a*) shows a front view of the housing and cooling subsystem together with the receiver/emitter subsystem as a reference, in which af is about 46.1 inches, and FIG. 22(*b*) shows a bottom view of the same, in which ag is about 55.2 inches. FIGS. 22(*c*) and 22(*d*) illustrate respective front and bottom views of the housing, in which ah is about 21.8 inches, and FIGS. 22(*e*) and 22(*f*) illustrate respective front and bottom views of the PV cell cooling system. As always, the indicated dimensions are exemplary only.

The housing protects the conversion system from the environment. For terrestrial applications, the housing protects the conversion system from rain, dust, wind, snow, hail, etc. The end of the STPV unit that faces the sun is highly reflective in order to reflect the sun's energy. The housing is tightly fitted together with rubber seals between the different sections. This is not only to prevent moisture from entering, but also to stop air from entering because of the partial vacuum that is maintained inside the housing.

For space applications, the housing design depends upon the expected space environment. For military applications in space, a heavier material might be used to protect the system from x-rays, neutrons, gamma, etc. On nonmilitary applications, the housing would be designed to protect the inside material from atomic oxygen, etc.

Figure 23:
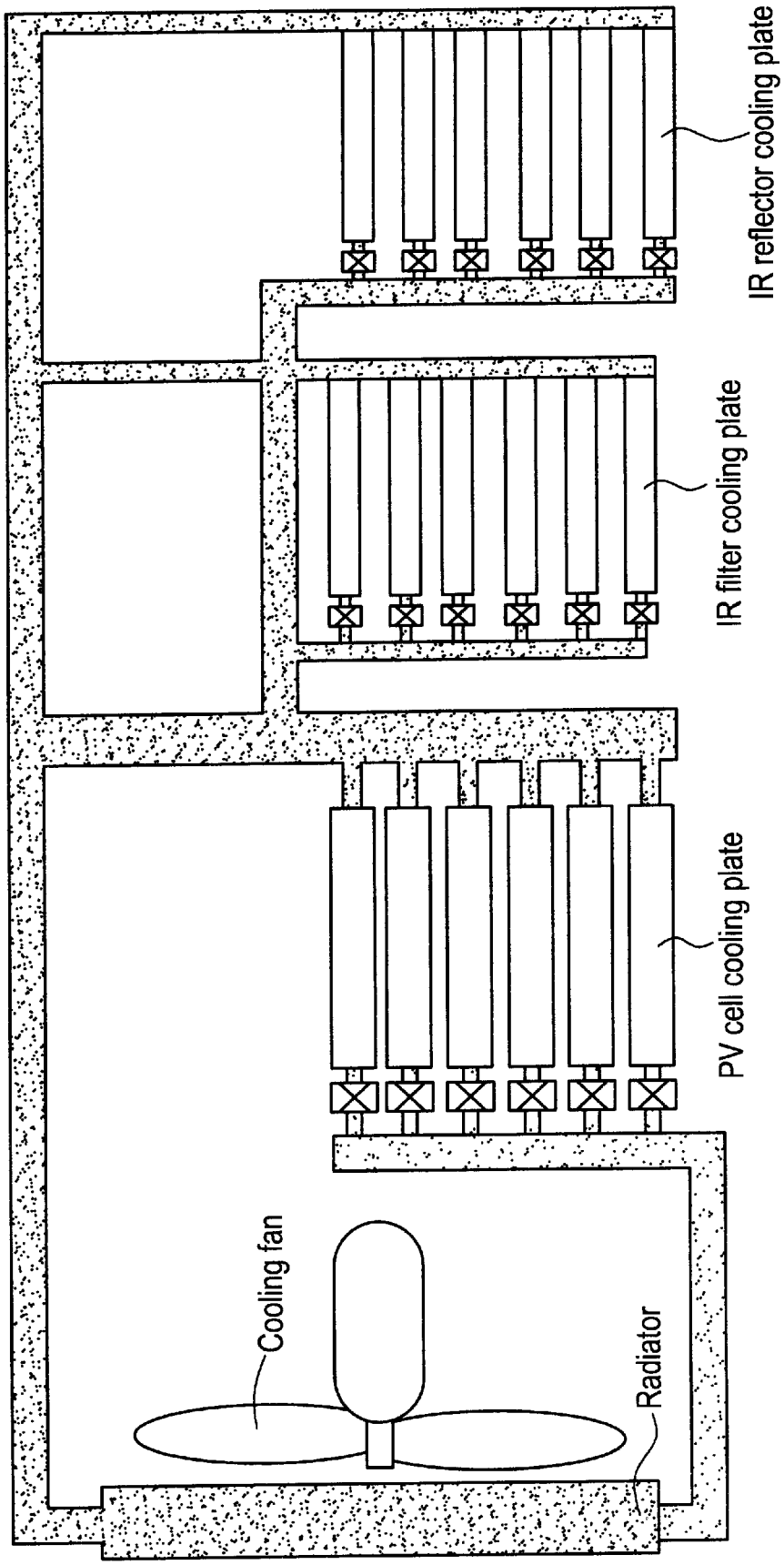
FIG. 23 is a view for explaining a cooling control loop.

The function of the cooling system is to protect all components and materials that cannot withstand the high temperatures. The PV cells must be maintained at the lowest temperature. The IR reflector is maintained at a much higher temperature. The cooling flow loop is shown in FIG. 23. First the cooling fluid from the radiator 2301 flows through the PV cells and then part of the cooling fluid flows through the IR reflector material. Since the IR reflector is maintained at a higher temperature, the cooling fluid from the IR filters and PV cells can also be used to cool the IR reflector. In this way the PV cooling fluid is doubly used.

Operating Description

The dish concentrator is commanded to track the sun. The sun's rays are reflected off the mirrors of the dish concentrator towards the focal point of the dish concentrator where the STPV conversion unit is located. As the dish concentrator focuses the sun's radiation, the aperture shutters are open. Most of the reflected sun's rays goes directly into the receiver cavity while other sun's rays reflect off the aperture reflector or aperture nozzle into the receiver cavity. The receiver absorbs the sun's energy and converts it to thermal energy which is conducted into the thermal storage material, some by direct conduction to the storage material and some energy is conducted along the thermal conducting rods. As the temperature of the thermal storage rises, the temperature of the emitter also rises. As the temperature of the emitter starts to rise, the surface radiation increases. Because the emitter temperature has not reached the operation temperature, most of the energy is out of the wavelength of the PV cell. During this warm up time, the cell IR filter/shutter is closed. Therefore the energy is reflected back towards the emitter surface were some of it is re-absorbed. When the temperature of the emitter reaches the operation temperature, one or more of the cell IR filter/shutters are moved to the open position. The IR radiation that is incident upon the filter plate and within the bandwidth of the filter is passed through to the PV cells and converted into electric energy. The energy that is not within the filter bandwidth is reflected back towards the emitter surface where part of it is re-absorbed. The part of it that is not absorbed is reflected where upon it is incident on another part of the emitter surface, the IR reflector, or the IR filter plate. If it is incident upon the later two surfaces, most of it (95% to 99%) will be reflected again and not lost from this chamber. As the temperature increases further, the thermal storage material reaches the phase change temperature. At this point the temperature stays the same while a large amount of energy is stored in the thermal storage material.

As the sun's energy decreases because the eclipse part of the orbit is reached in a space application or the sun is setting or a cloud obstructing in a terrestrial application, the aperture shutters are closed to prevent the lost of energy out of the receiver cavity. The power generation continues using the energy that is stored in the thermal storage material.

If the demand power load decreases, one or more of the cell IR filter/shutters are closed. Each filter plate can be closed half way or all the way. In the embodiment, there are 12 rows of cells (in the baseline system described earlier), therefore the power can be changed in steps of 1/12.

The control system controls the cell IR shutters and the aperture shutters. It also monitors temperature sensors on the IR filter/shutter plate and the PV mounting plate. When the temperature of the these components reaches the operating point, the controller opens the cooling valve which allows cooling fluid to flow through these components to keep them from exceeding the operating temperature. The cell IR filter/shutter has two operating temperatures. If the cell IR filter/shutter is open, the operating temperature is just slightly higher than the PV cell operating temperature. If the cell IR filter/shutter is closed, then the set point temperature is raised to just below the component survival level and flow through the cell cooling plate is stopped or decreased. This reduces the amount of thermal energy that must be removed by the cooling system and thereby lost from the system and decreases the parasitic power.

Figure 24A:
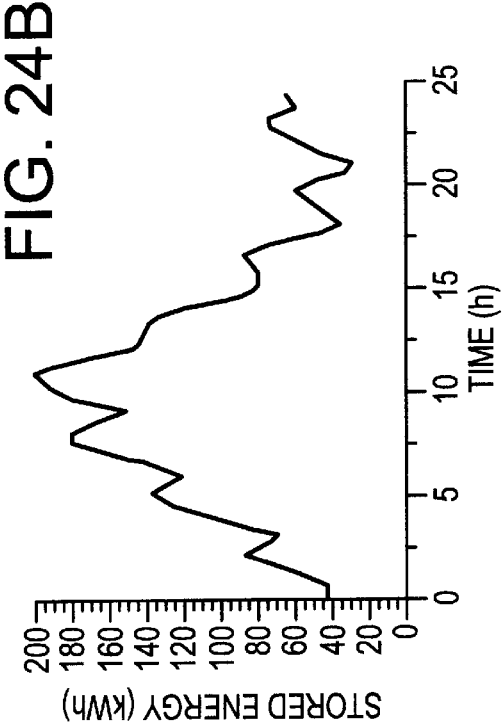
FIGS. 24(a) through 24(d) show examples of several performance parameters in accordance with the present invention.
Figure 24B:
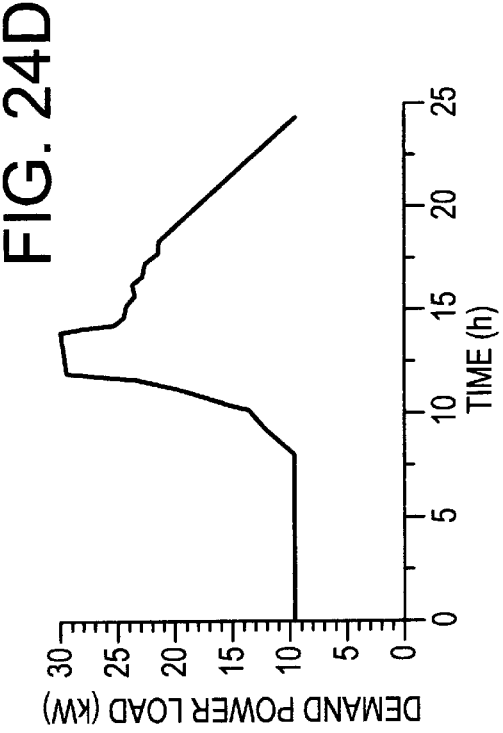
Figure 24C:
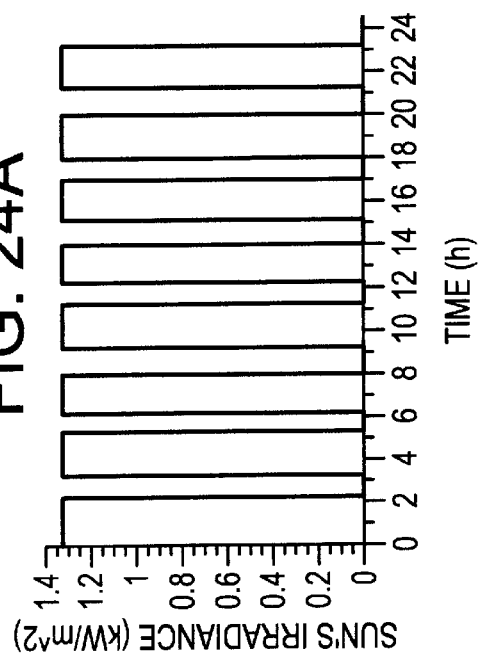
Figure 24D:
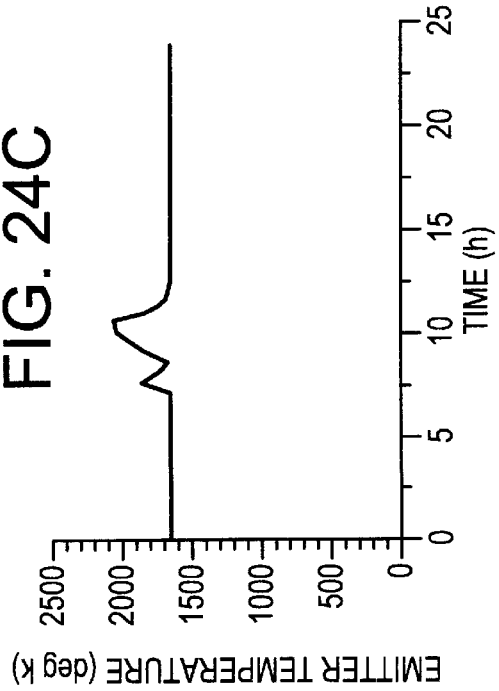

A dynamic simulation of a STPV power simulation was developed to investigate temperature transients, component sizing, power generating profiles, and load shifting capability. An example of several performance parameters is shown in FIGS. 24(a) through 24(d) for the functional operation of a STPV power system on a manned spacecraft through several orbits. A 3 hour orbit is assumed with a 2 hour sun period and a 1 hour eclipse. The electrical load profile assumed is composed of a constant support load (required all the time) of 10 kW, a working load that can increase up to 15 kW more over the base load for an 8 hour period, and a relaxing period load of up to 5 kW for an 8 h period. The plot of FIG. 24 (a) shows the sun's irradiance profile during the day/night part of the orbit. A constant solar irradiance of 1350 W/m2 was used during the sunlit portion of the orbit. The plot of FIG. 24(b) shows the amount of stored thermal energy as a result of a phase change in the storage media. The plot of FIG. 24(c) shows the temperature of the emitter substrate which was assumed to be the mean temperature of the thermal storage material, and the plot of FIG. 24(d) shows the demand electrical load which was also equal to the electric power generation profile. There is a startup period when no power can be generated because there is no energy in the thermal storage subsystem because the temperature of the emitter surface is below the operating temperature. This starting transient was not included in these plots.

The stored energy in the thermal storage subsystem shows a small amplitude cyclic variation that corresponds to the orbit day/night cycle. During the 8–10 hours of low power usage, the thermal stored energy increases with each orbit until all of the storage material has gone through the phase change. The temperature of the thermal storage remains constant during this time because of the phase change. When all the storage media has changed phase, the temperature begins to rise as shown in FIG. 24(c). At this time the power demand went up which reduced the temperature of the thermal storage material back to the phase change temperature. The storage material started going through the phase change, this time going from a liquid to a solid giving up the stored energy. At the end of the work day, the amount of stored energy is the same as it was at the start.

The generated power is regulated by changing the position of the cell IR/shutters. As the power demand goes up, the cell IR/shutters are open to illuminate more of the PV cells which produces more electrical power. The aperture shutters are open during the sun lit part of the orbit and closed during the eclipse. If the temperature of the thermal storage material approaches the maximum design temperature, then the aperture shutters are left open during the dark part of the orbit in order to radiate some of the excess energy back to space. At periods of time when the energy usage is low during the normal work day, the concentrator will stop tracking the sun for an orbit or two. This will ensure that the design temperature is not exceeded.

Although preferred embodiments of the present invention have been described in detail hereinabove, it should be clearly understood that many variations and/or modifications of the basic inventive concepts herein taught, which may appear to those skilled in the art, will still fall within the spirit and scope of the present invention as defined in the appended claims and their equivalents.

We claim:

1. A method for converting solar energy to electric energy, comprising:

focusing solar energy onto an absorptive receiver surface of a body to cause an emitting surface of the body to emit radiant energy having an emission spectrum comprising infrared radiation;

reducing the emission spectrum of the radiant energy emitted by the body to an infrared radiation spectrum range matching an optimal wavelength response spectrum of a photovoltaic cell; and, directing the radiant energy in the infrared radiation spectrum range onto the photovoltaic cell for conversion to electric energy.

2. A method as claimed in claim 1, further comprising storing the thermal energy absorbed by the body in a thermal reservoir for later conversion to electric energy.

3. A method as claimed in claim 2, further comprising selectively closing at least one shutter mechanism to prevent thermal energy from escaping from the thermal reservoir via a solar energy inlet during periods of low sunlight.

4. A method as claimed in claim 2, further comprising selectively closing at least one shutter mechanism to prevent radiant energy from impinging on the photovoltaic cell during periods of low output load demand.

5. A method as claimed in claim 1, wherein the emission spectrum of the radiant energy emitted by the emitting surface of the body is altered by a material coated on the emitting surface of the body.

6. A method as claimed in claim 1, wherein the emission spectrum of the radiant energy emitted by the emitting surface of the body is altered by an infrared filter interposed between the emitting surface of the body and the photovoltaic cell.

7. A method as claimed in claim 1, wherein the emission spectrum of the radiant energy emitted by the emitting surface of the body is altered by texturing the emitting surface of the body with micron holes.

8. A method as claimed in claim 1, wherein the emission spectrum of the radiant energy emitted by the emitting surface of the body is first altered by a material coated on the emitting surface of the body, and is second altered by an infrared filter interposed between the emitting surface of the body and the photovoltaic cell.

9. A method as claimed in claim 1, wherein the emission spectrum of the radiant energy emitted by the emitting surface of the body is first altered by texturing the emitting surface of the body with micron holes, is second altered by a material coated on the emitting surface of the body, and is third altered by an infrared filter interposed between the emitting surface of the body and the photovoltaic cell.

10. A method as claimed in claim 1, wherein said step of focusing of said solar energy onto the absorptive receiver surface of the body comprises using focusing means configured to reflect solar energy towards the absorptive receiver surface of the body, and said focusing means is selected from the group consisting of a concentrator dish and an aperture nozzle.

11. A solar-to-electric energy convertor, comprising;

a housing having a solar inlet which directs solar energy into the housing;

an absorptive body contained within said housing, wherein the solar energy is incident on a receiver surface part of said body to cause an emitting surface part of said body to emit radiant energy having an emission spectrum comprising infrared radiation;

a photovoltaic cell assembly having an optimal wavelength response spectrum at which an infrared radiation to electric conversion is of a maximum efficiency; and, means interposed between said photovoltaic cell assembly and said emitting surface of said body for reducing the emission spectrum of the radiant energy emitted by said body to an infrared radiation spectrum range matching an optimal wavelength response spectrum of a photovoltaic cell, wherein the radiant energy having the reduced emission spectrum is directed onto said photovoltaic cell assembly.

12. The solar-to-electric convertor as claimed in claim 11, wherein said means is a material coated on said emitting surface of said body.

13. The solar-to-electric convertor as claimed in claim 11, wherein said means is an infrared filter.

14. The solar-to-electric convertor as claimed in claim 13, further comprising a cooling system for controlling a coolant flow thereof to maintain at least the photovoltaic cell assembly and the infrared filters at respective operating temperatures.

15. The solar-to-electric convertor as claimed in claim 11, wherein said means is a micro-hole texturing on said emitting surface of said body.

16. The solar-to-electric convertor as claimed in claim 11, wherein said means is the combination of a material coated on a surface of said body and an infrared filter.

17. The solar-to-electric convertor as claimed in claim 11, wherein said means is the combination of a micro-hole texturing of said emitting surface of said body, a material coated on said emitting surface of said body and an infrared filter.

18. The solar-to-electric convertor as claimed in claim 11, further comprising a thermal reservoir which is thermally coupled to said body.

19. The solar-to-electric convertor as claimed in claim 18, further comprising a shutter for selectively closing the solar inlet to prevent thermal energy from escaping from said thermal reservoir via said solar inlet.

20. The solar-to-electric converter as claimed in claim 18, further comprising a shutter for selectively closing to prevent impingement of the radiant energy onto said photovoltaic cell.

21. The solar-to-electric converter as claimed in claim 18, further comprising a first shutter for selectively closing the solar inlet to prevent thermal energy from escaping from said thermal reservoir via said solar inlet, and a second shutter for selectively closing to prevent impingement of the radiant energy onto said photovoltaic cell.

22. The solar-to-electric converter as claimed in claim 11, wherein said body includes a front surface on which the solar energy is incident, a rear surface, and an outer side surface extending between said front and rear surfaces and extending 360 degrees around a longitudinal axis of said body, wherein said outer side surface is defined by a plurality of elongate concave surface portions extending parallel to and spaced around said longitudinal axis of said body and by a plurality of elongate land surface portions extending between respectively adjacent concave surface portions, each concave surface portion radiating radiant energy outwardly from said longitudinal axis and having a cross-section curvature normal to said longitudinal axis which is circular.

23. The solar-to-electric convertor as claimed in claim 22, further comprising at least one infrared filter and shutter assembly mounted to two of said land surface portions so as to extend over a one of said concave surface portions located on opposing sides of said two land surface portions.

24. The solar-to-electric convertor as claimed in claim 11, wherein said receiver surface part has a concave configuration to increase solar absorption of said body.

25. The solar-to-electric convertor as claimed in claim 24, wherein said receiver surface part includes micron hole texturing to reduce infrared emissions therefrom.

26. The solar-to-electric convertor as claimed in claim 24, wherein said receiver surface part includes a surface coating to reduce infrared emissions therefrom.

27. The solar-to-electric converter as claimed in claim 11, further comprising infrared reflectors for concentrating the radiant energy having the spectrally optimized emission spectrum onto said photovoltaic cell assembly.

28. The solar-to-electric convertor as claimed in claim 11, wherein said solar inlet includes an aperture reflector and an aperture nozzle configured to reflect solar energy towards said receiver surface part of said body.

29. The solar-to-electric convertor as claimed in claim 11, further comprising a plurality of peak power point regulators coupled to plural series connections, respectively, of photovoltaic cells of said photovoltaic cell assembly.

* * * * *